United States Patent
Sano

(10) Patent No.: US 8,786,961 B2
(45) Date of Patent: Jul. 22, 2014

(54) IMAGE PICKUP LENS

(75) Inventor: Eigo Sano, Tokyo (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 0 days.

(21) Appl. No.: 13/810,659

(22) PCT Filed: Jul. 7, 2011

(86) PCT No.: PCT/JP2011/065596
§ 371 (c)(1),
(2), (4) Date: Jan. 16, 2013

(87) PCT Pub. No.: WO2012/008357
PCT Pub. Date: Jan. 19, 2012

(65) Prior Publication Data
US 2013/0120858 A1    May 16, 2013

(30) Foreign Application Priority Data

Jul. 16, 2010    (JP) ................................. 2010-161403

(51) Int. Cl.
| | | |
|---|---|---|
| G02B 13/18 | (2006.01) | |
| H04N 5/225 | (2006.01) | |
| G02B 13/00 | (2006.01) | |
| G02B 9/62 | (2006.01) | |
| G02B 3/04 | (2006.01) | |
| H04N 5/335 | (2011.01) | |

(52) U.S. Cl.
CPC .............. *G02B 13/0045* (2013.01); *G02B 9/62* (2013.01); *G02B 3/04* (2013.01); *H04N 5/335* (2013.01)
USPC .......................................... 359/713; 348/340

(58) Field of Classification Search
CPC ...... G02B 13/0045; G02B 13/22; G02B 9/62; G02B 3/04; H04N 5/335
USPC ............................ 348/340; 359/713, 756, 757
See application file for complete search history.

(56) References Cited

U.S. PATENT DOCUMENTS

| 8,310,767 B2 * | 11/2012 | Huang et al. .................. 359/713 |
| 8,472,128 B2 * | 6/2013 | Huang ........................... 359/713 |
| 8,514,499 B2 * | 8/2013 | Hsu et al. ...................... 359/713 |
| 2001/0022695 A1 | 9/2001 | Nishio |

FOREIGN PATENT DOCUMENTS

| JP | 2001-228399 | 8/2001 |
| JP | 2006-293042 | 10/2006 |
| JP | 2007-279282 | 10/2007 |
| WO | WO 2010/024198 | 3/2010 |

OTHER PUBLICATIONS

NPL English translation of International Search Report (PCT/ISA/210) for prepared for PCT/JP2011/065596 (mailed Sep. 6, 2011).*
NPL English translation of Written Opinion of the International Search Authority (PCT/ISA/237) for prepared for PCT/JP2011/065596 (mailed Sep. 6, 2011).*

* cited by examiner

*Primary Examiner* — David N Spector
(74) *Attorney, Agent, or Firm* — Cozen O'Connor

(57) ABSTRACT

There is provided an image pickup lens having a 6-element structure which has a small size and a sufficiently lens speed of F/2 or less and in which various aberrations are corrected favorably. This image pickup lens includes a first lens having a positive refractive power and comprising a convex surface directed to the object side; a second lens having a negative refractive power and comprising a concave surface directed to the image side; a third lens having a positive or negative refractive power; a fourth lens having a positive refractive power; a fifth lens having a positive refractive power and comprising a convex surface directed to the image side; and a sixth lens having a negative refractive power and comprising a concave surface directed to the image side, in this order from the object side, wherein the image side surface of the sixth lens has an aspherical shape and an inflection point at a position other than an intersection point with the optical axis, and the image pickup lens satisfies the following conditional expressions.

$$vd1 > 50$$

$$vd2 \leq 30$$

where, vd1 is an Abbe number of the first lens, and vd2 is an Abbe number of the second lens.

6 Claims, 18 Drawing Sheets

FIG. 2
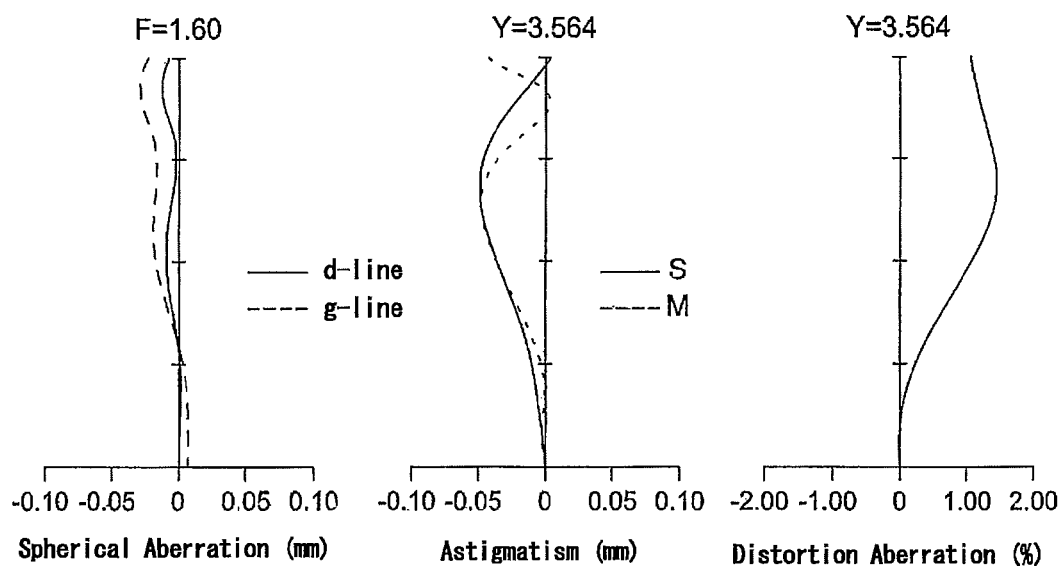
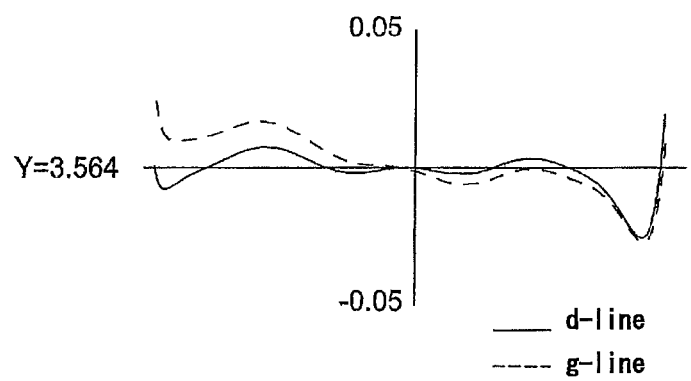
Meridional Comatic Aberration
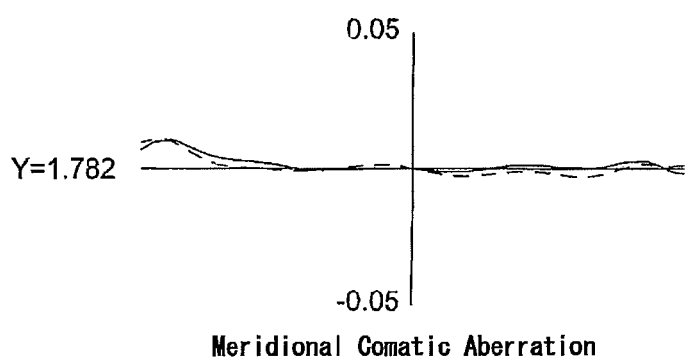
Meridional Comatic Aberration FIG. 4
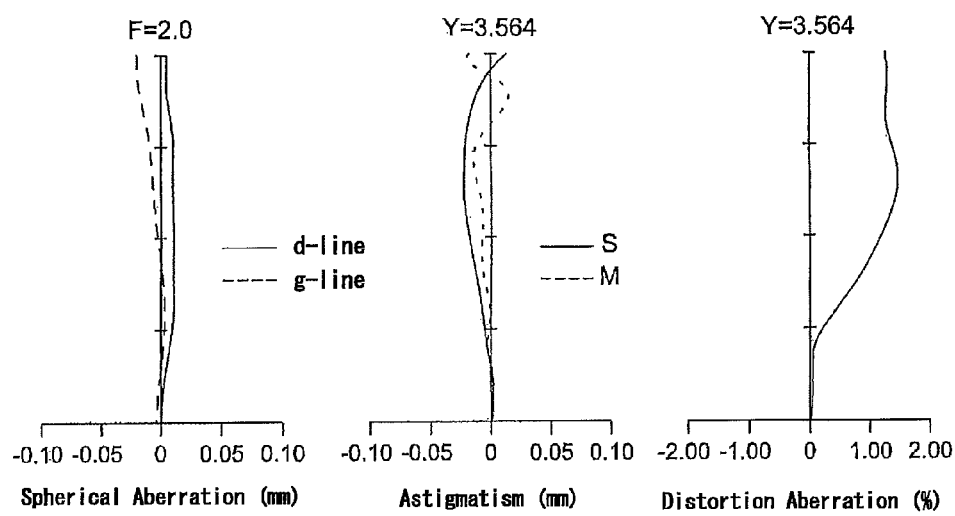
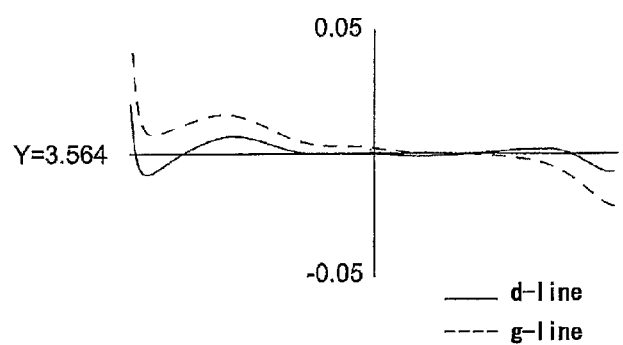
Meridional Comatic Aberration
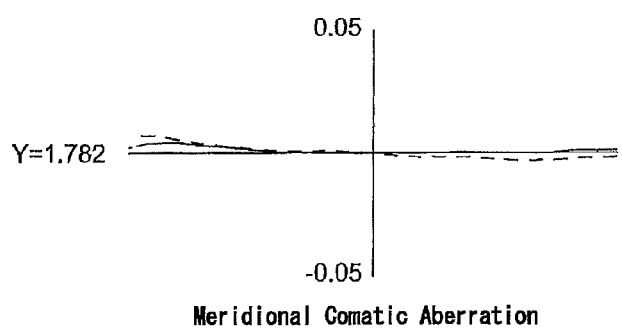
Meridional Comatic Aberration FIG. 6
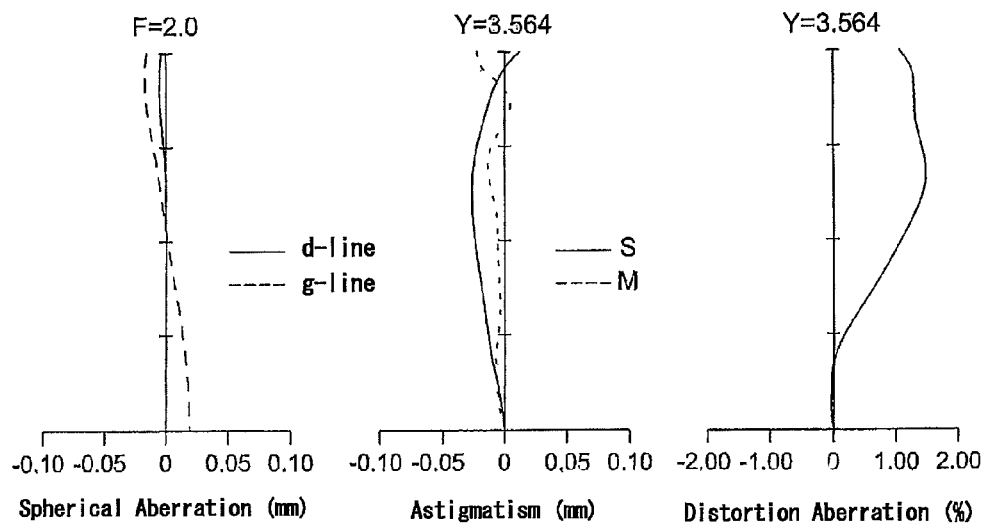
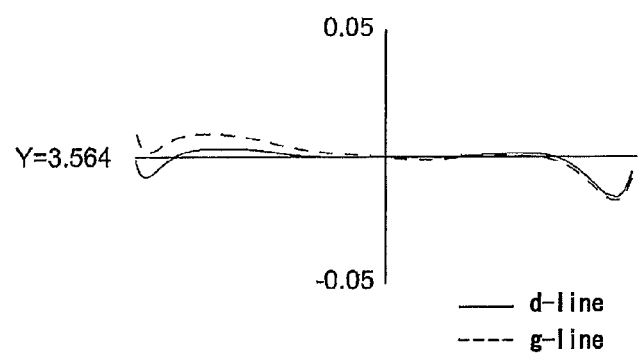
Meridional Comatic Aberration
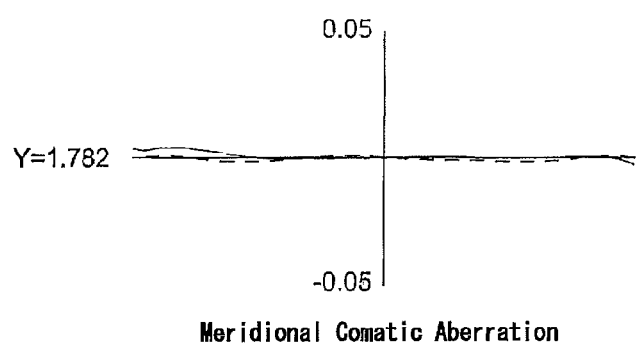

FIG. 10
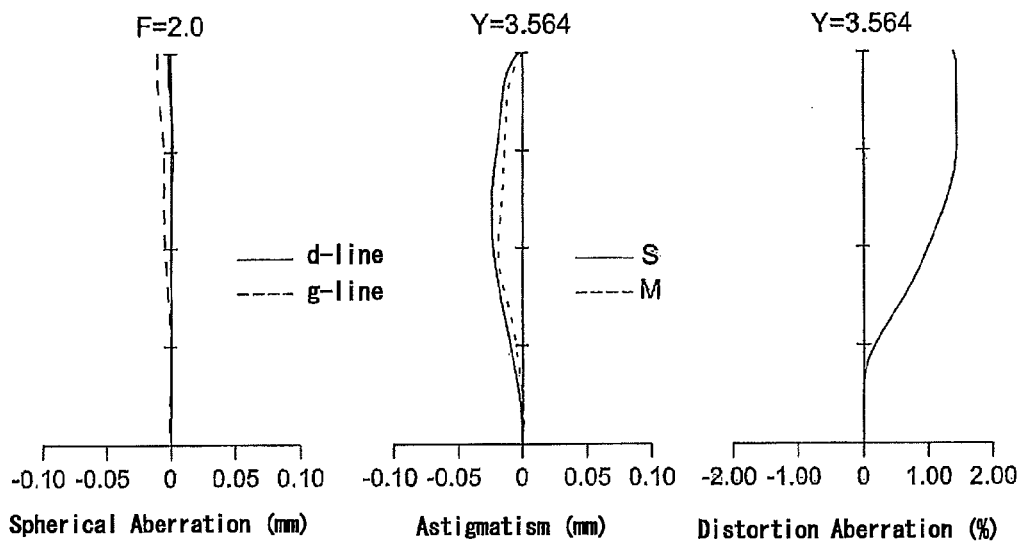
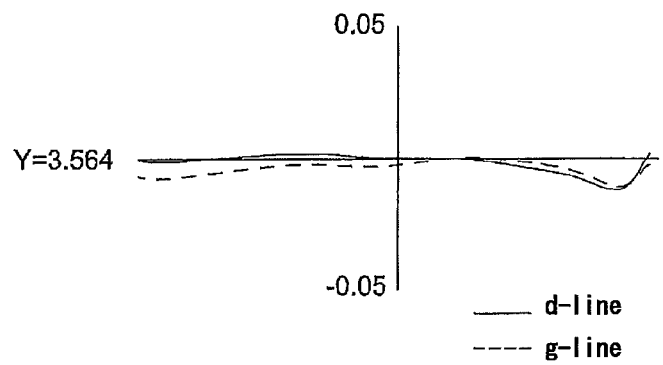
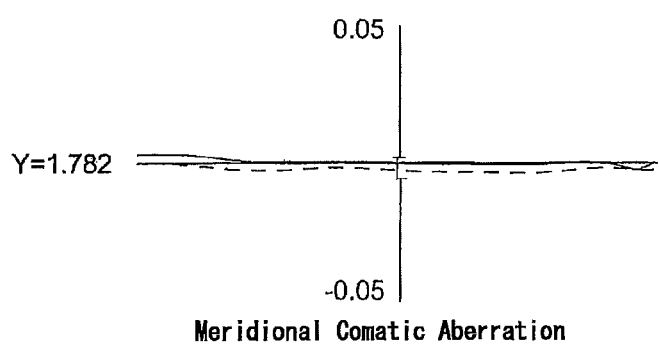

FIG. 12
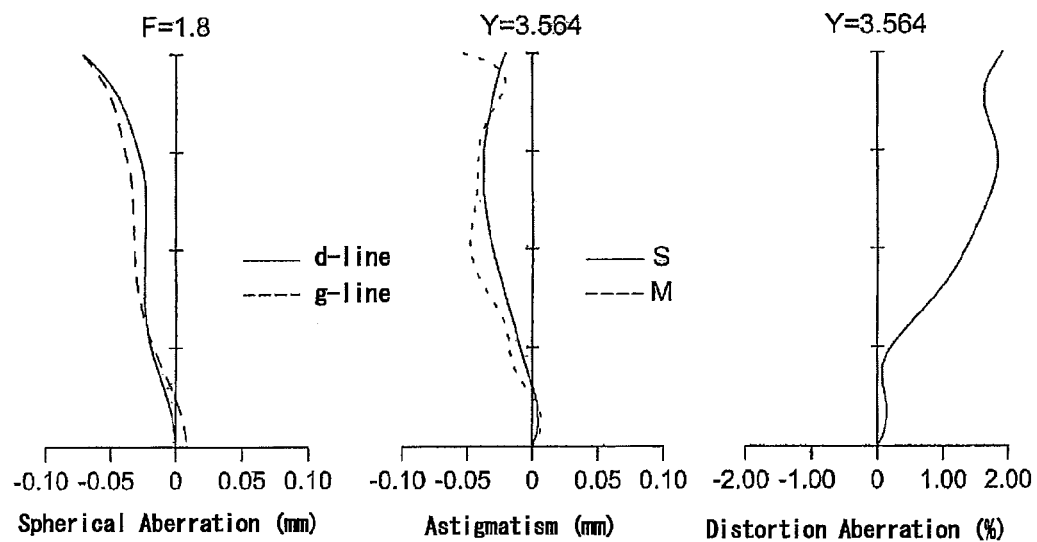
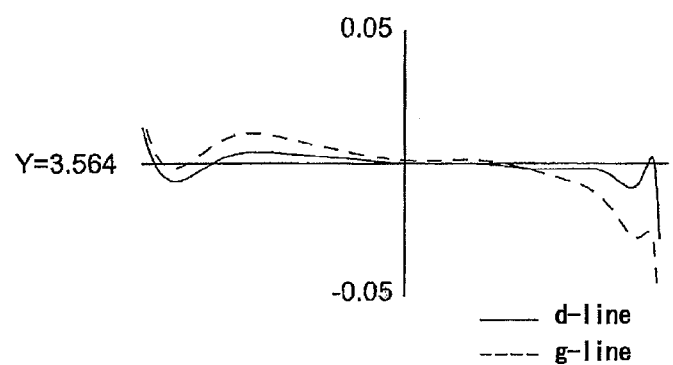
Meridional Comatic Aberration
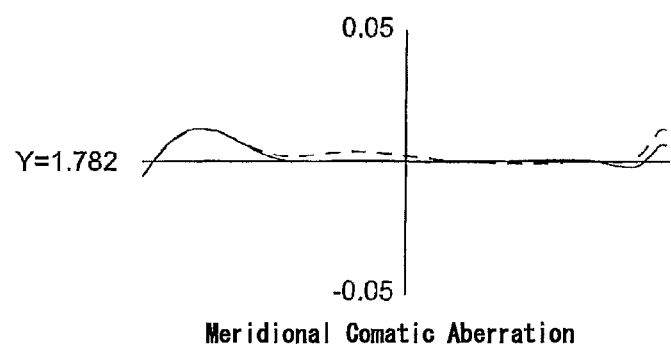
Meridional Comatic Aberration Meridional Comatic Aberration FIG. 16
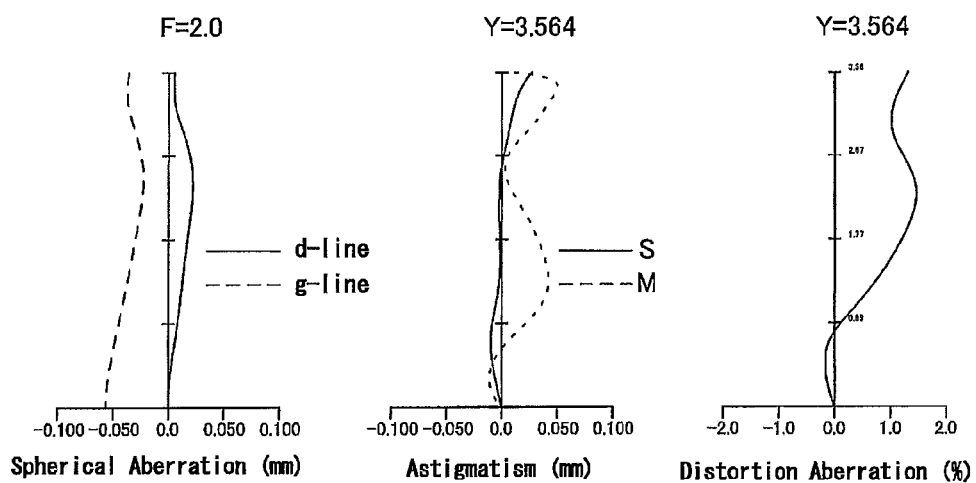
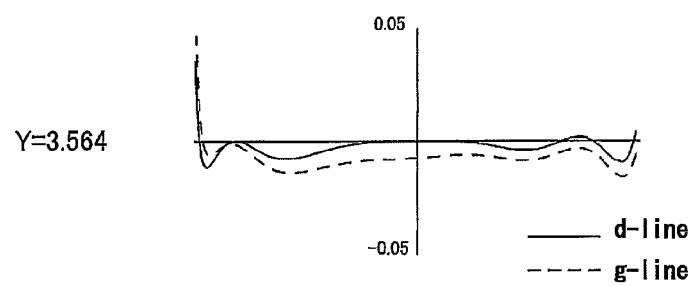
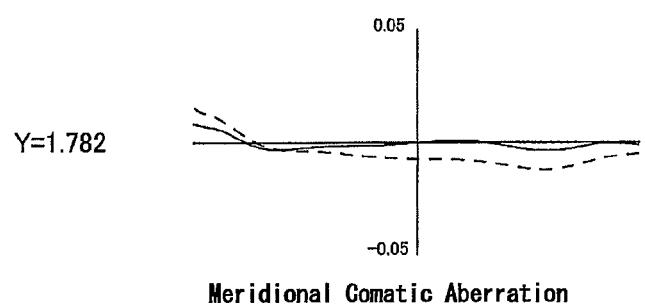
Meridional Comatic Aberration FIG. 18
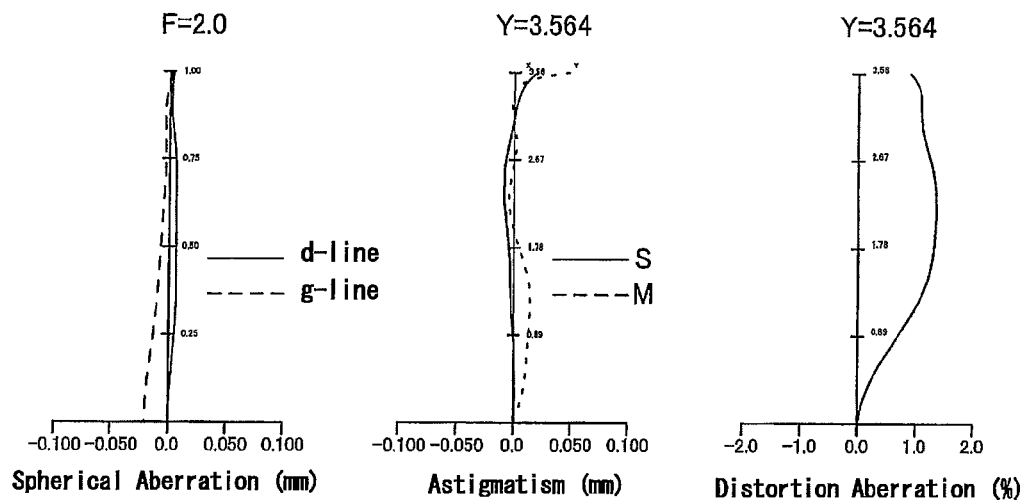
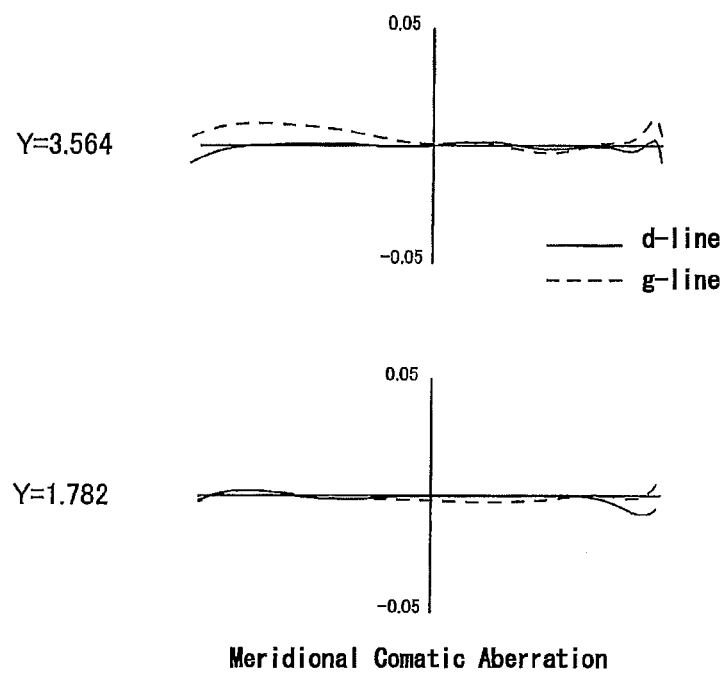
Meridional Comatic Aberration

IMAGE PICKUP LENS

RELATED APPLICATIONS

This is a U.S. National Phase Application under 35 USC 371 of International Application PCT/JP2011/065596 filed on Jul. 7, 2011.

This application claims the priority of JP 2010161403 filed Jul. 16, 2010, the entire content of which is hereby incorporated by reference.

TECHNICAL FIELD

The present invention relates to a small and fast image pickup lens which is suitable for an image pickup device using a solid-state image sensor such as a CCD-type image sensor and a CMOS-type image sensor.

BACKGROUND ART

Recently, along with the wider spread of a mobile terminal on which there is mounted an image pickup device using a solid-state image sensor such as a CCD-type image sensor and a CMOS-type image sensor, a mobile terminal on which there is mounted an image pickup device using an image sensor having a larger number of pixels so as to obtain a higher quality image has become available on the market. So far, the image sensor having a larger number of pixels was accompanied by a larger size, but recently, higher resolution of the pixel has advanced and the size of the image sensor has become smaller. While a high resolution is required for an image pickup lens used with the image sensor having such a higher-resolution pixel, since resolution is restricted by an F-number and a higher resolution can be obtained by a faster or brighter lens having a smaller F-number, a sufficiently high performance has not been realized by a conventionally used F-number of approximately F/2.8. Accordingly, there has been required a faster image pickup lens having an F-number of 2 or less, which is suitable for an image sensor having a larger number of pixels, a higher-resolution pixel, and a smaller size. As an image pickup lens for such an application, a five-element structure image pickup lens, which allows a higher aperture ratio and a higher performance than a three-element or four-element structure lens, is disclosed in a patent publication.

For the five-element structure image pickup lens, there is disclosed an image pickup lens configured with a front group which includes, in order from the object side, a first lens having a positive or negative refractive power, a second lens having a positive refractive power, an aperture stop, and a rear group which includes a third lens having a negative refractive power, a fourth lens having a positive refractive power, and a fifth lens having a negative or positive refractive power (refer to patent literatures 1 and 2, for example).

CITATION LIST

Patent Literature

PTL 1: Japanese Patent Laid-Open No. 2007-279282
PTL 2: Japanese Patent Laid Open No. 2006-293042

SUMMARY OF INVENTION

Technical Problem

An image pickup lens described in patent literature 1 is an image pickup lens having an F-number of approximately 2.8, and, when the lens is made fast up to an F-number of 2 or less, correction of spherical aberration and comatic aberration becomes insufficient and a preferable performance cannot be secured. Furthermore, both of the front group and the rear group are configured having positive refractive powers, and thus the principal point of the optical system shifts to the object side as compared with a configuration such as a telephoto type in which the rear group has a negative refractive power, and the lens has a disadvantage for downsizing because of a longer back focus.

Although an image pickup lens described in patent literature 2 has a lens speed of approximately F/2, both of the first lens and the second lens are configured having positive refractive powers, and thus color correction in the front group is insufficient. Furthermore, as in the image pickup lens of patent literature 1, both of the front group and the rear group are configured having positive refractive powers and also the reamost lens is a positive lens, and thus this image pickup lens has a disadvantage for downsizing.

The present invention has been achieved in view of such a problem and aims at providing a six-element structure image pickup lens which has a small size and a sufficiently high lens speed of F/2 or less and in which various aberrations are corrected preferably.

Here, for a scale of a small size image pickup lens, the present invention aims at realizing downsizing having a level satisfying the following conditional expression. By this range being satisfied, it becomes possible to realize a smaller size and a lighter weight for the entire image pickup device.

$$L/2Y<1.1 \qquad (6).$$

Here,

L: Distance on an optical axis from a lens surface of the entire image pickup lens system closest to the object side to a focal point on the image side, 2Y: Diagonal length on an image pickup surface of a solid-state image sensor (diagonal length of an effective rectangular image pixel area in a solid-state image sensor), in which the focal point on the image side means an image point when parallel rays parallel to the optical axis enter the image pickup lens.

Note that, when a parallel plate such as an optical low-pass filter, an infrared cut filter, or a seal glass of a solid-state image sensor package is disposed between a surface of the entire image pickup lens closest to the image side and the focal point on the image side, the above-mentioned value L is calculated after the parallel plate portion has been converted to the value equivalent length in air.

Solution to Problem

The above object is achieved by following inventions [1] to [5].

[1] An image pickup lens for forming an image of a subject onto a photoelectric conversion part of a solid-state image sensor, comprising, in order from an object side thereof:
a first lens having a positive refractive power and comprising a convex surface directed to an object side;
a second lens having a negative refractive power and comprising a concave surface directed to an image side;
a third lens having a positive or negative refractive power;
a fourth lens having a positive or negative refractive power;
a fifth lens having a positive refractive power and comprising a convex surface directed to the image side; and
a sixth lens having a negative refractive power and comprising a concave surface directed to the image side, wherein an image side surface of the sixth lens comprises an aspherical shape and an inflection point at a position other than an intersection point with an optical axis, and the image pickup lens satisfies the following conditional expressions:

$$vd1 > 50 \quad (1)$$

$$vd2 \leq 30 \quad (2)$$

where, vd1 is an Abbe number of the first lens, and vd2 is an Abbe number of the second lens.

Note that the image pickup lens can include a lens substantially without having power, in addition to the first to sixth lenses.

[2] The image pickup lens which is described in above [1], and satisfies the following conditional expression:

$$0.8 < DL/f < 1.4 \quad (3)$$

where,

DL is a distance on the optical axis from an surface apex of the first lens on the object side to a surface apex of the sixth lens on the image side, and f is a focal length of an entire image pickup lens system.

[3] The image pickup lens which is described in either above [1] or [2], and satisfies the following conditional expression:

$$0.8 < f1/f < 1.6 \quad (4)$$

where, f1 is a focal length of the first lens, and f is a focal length of an entire image pickup lens system.

[4] The image pickup lens which is described in any one of above [1] to [3], and satisfies the following conditional expression:

$$0.35 < f45/f < 0.60 \quad (5)$$

where, f45 is a composite focal length of the fourth lens and the fifth lens, and f is a focal length of an entire image pickup lens system.

[5] The image pickup lens described in any one of above [1] to [4], in which all the lenses are formed of plastic material.

Advantage of Invention

Advantage of Invention [1]

The lens configuration of the present invention for obtaining an image pickup lens which has a small size and a favorably corrected aberration is a configuration referred to as so-called a telephoto type and advantageous for downsizing of the total length of the image pickup lens.

Furthermore, by configuring two to four elements in the six element structure with negative lenses, the number of surfaces having divergence effects is increased and the Petzval sum is easily corrected, and it becomes possible to obtain an image pickup lens in which a preferable imaging quality is secured up to the periphery of a picture.

Moreover, by configuring the image side surface in the sixth lens disposed in the outermost position on the image side as an aspherical surface, it is possible to preferably correct various aberrations on the periphery of the picture. In addition, by using the aspherical surface having the inflection point at a position other than the intersection point with the optical axis, it becomes easy to secure telecentric characteristics of an image side light rays.

Here, "inflection point" means a point on an aspherical surface where a tangential plane becomes a plane perpendicular to an optical axis, in a curve of a lens cross-sectional shape within an effective radius.

Conditional expressions (1) and (2) are conditional expressions for appropriately setting the Abbe numbers of the first lens and the second lens. By application of material satisfying the ranges of conditional expressions (1) and (2) to the positive first lens and the negative second lens, it is possible to favorably correct color aberration across the on-axis position to an out-of-axis area although in a fast lens having an F-number of 2 or less.

Advantage of Invention [2]

Conditional expression (3) in invention [2] is a conditional expression for appropriately setting the composite thickness of the first lens to the sixth lens.

By the setting the value being lower than the upper limit, it is possible to secure a sufficiently long back focus for a total lens length. In contrast, by the setting the value being higher than the lower limit, the composite thickness of the lens does not become too small, and it is possible to prevent the refractive power of each lens from becoming too strong and to keep image surface variation caused by a manufacturing error low.

Furthermore, the following conditional expression is more desirable.

$$0.9 < DL/f < 1.3 \quad (3)'$$

Advantage of Invention [3]

The conditional expression (4) in invention [3] is a conditional expression for appropriately setting the focal length of the first lens and for appropriately achieving downsizing of the total length of the image pickup lens and aberration correction.

By a value in conditional expression (4) being lower than the upper limit, it is possible to appropriately maintain the refractive power of the first lens, to dispose the composite principal point of the first lens to the sixth lens closer to the object side, and to shorten the total length of the image pickup lens. In contrast, by using a value higher than the lower limit, the refractive power of the first lens does not become larger than necessary and it is possible to suppress higher order spherical aberration and comatic aberration which are generated in the first lens.

Furthermore, the following conditional expression is more desirable.

$$0.9 < f1/f < 1.5 \quad (4)'$$

Advantage of Invention [4]

Conditional expression (5) in invention [4] is a conditional expression for appropriately setting the composite focal length of the fourth lens and the fifth lens.

By a value in conditional expression (5) being higher than the lower limit, the composite focal length of the forth lens and the fifth lens does not become too small, and it is possible to suppress generation of higher order spherical aberration and comatic aberration. In contrast, by using a value lower than the upper limit, it is possible to appropriately maintain the composite focal length of the fourth lens and the fifth lens and to achieve downsizing of the total length of the image pickup lens.

Moreover, the following conditional expression is more preferable.

$$0.40 < f45/f < 0.55 \quad (5)'$$

Advantage of Invention [5]

Recently, for the purpose of downsizing the whole solid-state image pickup device, there has been developed a solid-state image sensor having a smaller pixel pitch and resultantly having a smaller image pickup surface size even if solid-state image sensors have the same number of pixels. An image pickup lens for such a solid-state image sensor having a smaller image pickup surface size is required to comparatively shorten the focal length of the entire system, and thus the curvature radius and the outer diameter of each lens become considerably small. Accordingly, as compared with a glass lens which is manufactured by time-consuming polishing processing, by configuring all the lenses with plastic lenses manufactured by injection molding, mass production is possible at a low cost even for a lens having a small curvature radius and outer diameter. Moreover, since press temperature of the plastic lens can be lowered, wear damage of an injection mold can be suppressed, and resultantly the number of injection mold exchanges and the number of maintenances can be reduced and it leads to cost reduction.

BRIEF DESCRIPTION OF DRAWINGS

FIG. 2 is an aberration diagram of Example 1.
FIG. 4 is an aberration diagram of Example 2.
FIG. 6 is an aberration diagram of Example 3.
FIG. 10 is an aberration diagram of Example 5.
FIG. 12 is an aberration diagram of Example 6.
FIG. 16 is an aberration diagram of Example 8.
FIG. 18 is an aberration diagram of Example 9.

DESCRIPTION OF EMBODIMENTS

In the following, with reference to FIG. 1 or the like, there will be explained an image pickup lens in an embodiment of the present invention. Note that an image pickup lens 10 illustrated in FIG. 1 has the same configuration as an image pickup lens of Example 1 which will be described below.

Figure 1:
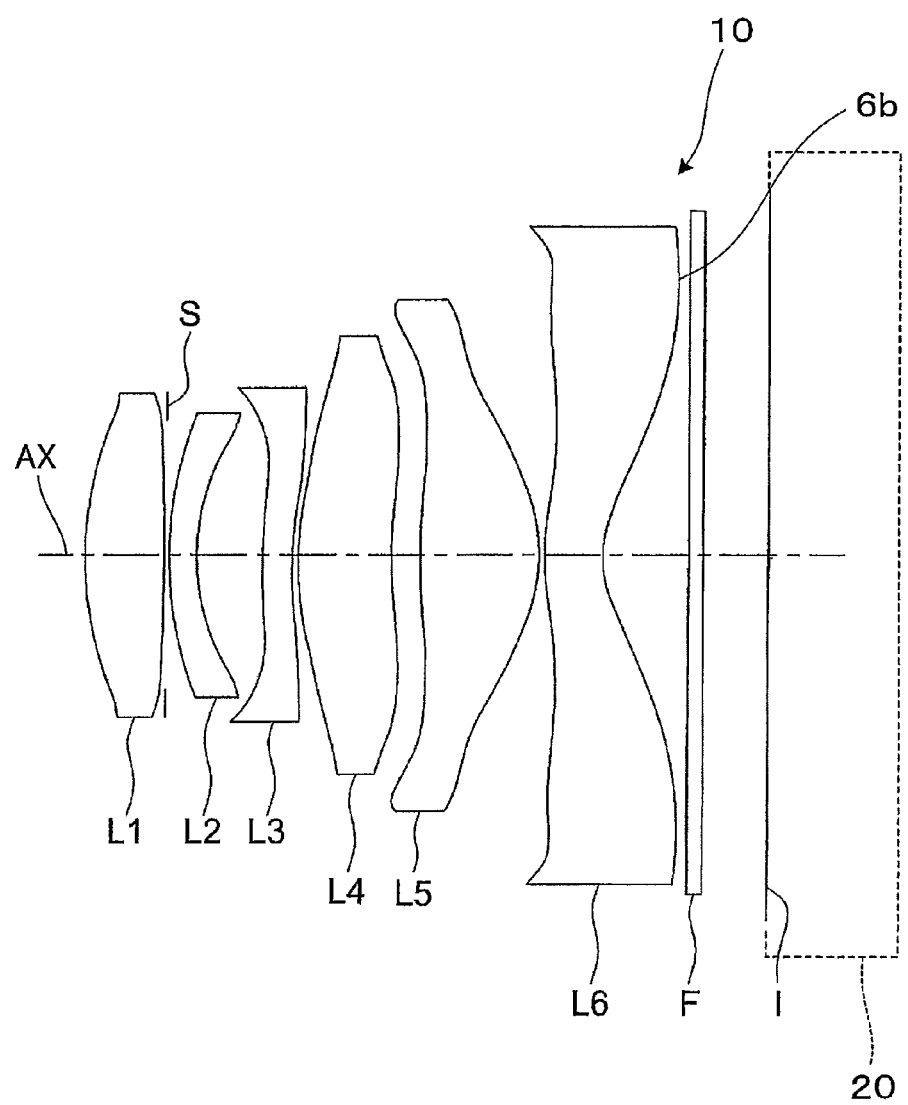
FIG. 1 is a cross-sectional view of a lens in Example 1 which is an image pickup lens in an embodiment of the present invention.

As shown in FIG. 1, the image pickup lens 10 of the embodiment is an image pickup lens for forming an image of a subject on a photoelectric conversion part 20 of a solid-state image sensor and is configured with a first lens L1 having a positive refractive power and having a convex surface directed to the object side, a second lens L2 having a negative refractive power and having a concave surface directed to the image side, a third lens L3 having a positive or negative refractive power, a fourth lens L4 having a positive or negative refractive power, a fifth lens L5 having a positive refractive power and having a convex surface directed to the image side, and a sixth lens L6 having a negative refractive power and having a concave surface directed to the image side. Here, "is configured with" means "substantially is consisting of". The image side surface 6b of the sixth lens L6 has an aspherical shape and an inflection point at a position other than an intersection point with an optical axis OA. Note that an aperture stop S is disposed on the entrance side, that is, the object side of the first lens L1, for example. Furthermore, a parallel plate F and the photoelectric conversion part 20 of the solid-state image sensor are disposed on the exit side, that is, the image side of the sixth lens L6, and the image formation by the image pickup lens 10 is performed on an image pickup surface I of the photoelectric conversion part 20.

The above image pickup lens 10 satisfies conditional expressions below (1) and (2).

$$vd1 > 50 \quad (1)$$

$$vd2 \leq 30 \quad (2)$$

Here, vd1 is the Abbe number of the first lens L1, and vd2 is the Abbe number of the second lens L2.

The image pickup lens 10 satisfies the already-described conditional expressions (3) to (6), in addition to the above conditional expressions (1) and (2).

More preferably, the image pickup lens 10 satisfies the already-described conditional expressions (3)' to (5)' which are more restrictive than the above conditional expressions (1) to (6).

EXAMPLES

In the following, there will be shown examples of the image pickup lens of the present invention. Symbols to be used in each of the examples are as follows.

f: Focal length of the entire image pickup lens system
fB: Back focus
F: F-number
2Y: Diagonal length of an image pickup surface in a solid-state image sensor
ENTP: Entrance pupil position (distance from the first surface to an entrance pupil position)
EXTP: Exit pupil position (distance from the image pickup surface to an exit pupil position)
H1: Front-side principal point position (distance from the first surface to a front-side principal point position)
H2: Rear-side principal point position (distance from the last surface to a rear-side principal point position)
R: Curvature radius
D: Axial surface separation or distance
Nd: Refractive index of lens material relative to d-line
vd: Abbe number of lens material In each of the examples, a surface for which "*" is described after each surface number is a surface with an aspherical shape, and the aspherical shape is expressed by following expression 1 when the apex of the surface is set to an origin, an X axis is defined in the optical axis direction, and h expresses a height in a direction perpendicular to the optical axis.

$$X = \frac{h^2/R}{1 + \sqrt{1-(1+K)h^2/R^2}} + \sum A_i h^i \quad \text{[Formula 1]}$$

Here,
Ai: i-order aspherical surface coefficient
K: Conical constant
Furthermore, in the aspherical surface coefficient, a power of 10 (e.g., $2.5 \times 10^{-02}$) is expressed using E (e.g., 2.5E-02).

Example 1

General specifications of an image pickup lens are as follows.

f = 4.67 mm
fB = 0.66 mm
F = 1.6
2Y = 7.128 mm
ENTP = 0.57 mm
EXTP = −4.07 mm
H1 = 0.62 mm
H2 = −4.01 mm

Surface data of the image pickup lens is as follows.

| S (Surface No.) | R (mm) | D (mm) | Nd | vd | ER (mm) (Effective radius) |
|---|---|---|---|---|---|
| 1 | infinite | 0.00 | | | 1.90 |
| 2* | 3.703 | 0.81 | 1.54470 | 56.2 | 1.67 |
| 3* | −29.698 | 0.00 | | | 1.50 |
| 4 (stop) | infinite | 0.05 | | | 1.39 |
| 5* | 2.157 | 0.30 | 1.63200 | 23.4 | 1.45 |
| 6* | 1.610 | 0.67 | | | 1.46 |
| 7* | 10.926 | 0.30 | 1.63200 | 23.4 | 1.50 |
| 8* | 2.990 | 0.06 | | | 1.72 |
| 9* | 2.551 | 0.94 | 1.54470 | 56.2 | 2.12 |
| 10* | 5.764 | 0.32 | | | 2.27 |
| 11* | 20.813 | 1.22 | 1.54470 | 56.2 | 2.40 |
| 12* | −1.179 | 0.05 | | | 2.64 |
| 13* | 4.317 | 0.61 | 1.54470 | 56.2 | 3.05 |
| 14* | 0.945 | 0.90 | | | 3.41 |
| 15 | infinite | 0.15 | 1.51630 | 64.1 | 3.49 |
| 16 | infinite | | | | 3.52 |

Note that all the lenses are formed of plastic material.
Aspherical surface coefficients are as follows.

Second surface

K = 0.15565E−02, A4 = 0.29538E−02, A6 = −0.29632E−02,
A8 = −0.46862E−03, A10 = 0.55858E−03, A12 = −0.19525E−03

Third surface

K = −0.50000E+02, A4 = −0.97019E−02, A6 = 0.13535E−01,
A8 = −0.10035E−01, A10 = 0.27070E−02, A12 = −0.33166E−03

Fifth surface

K = −0.63639E+01, A4 = −0.10314E−01, A6 = 0.85848E−02,
A8 = −0.55201E−02, A10 = 0.11529E−02, A12 = −0.16212E−03

Sixth surface

K = −0.33615E+01, A4 = −0.80437E−02, A6 = 0.20540E−02,
A8 = −0.10884E−02, A10 = −0.20540E−03, A12 = −0.25562E−03

Seventh surface

K = 0.63060E+01, A4 = −0.29748E−01, A6 = −0.28521E−02,
A8 = −0.18928E−02, A10 = −0.40306E−04, A12 = 0.45408E−04

Eighth surface

K = −0.38984E+02, A4 = −0.99770E−02, A6 = −0.40859E−02,
A8 = −0.23376E−03, A10 = −0.11218E−03, A12 = 0.17508E−03

Ninth surface

K = −0.27502E+02, A4 = −0.70657E−02, A6 = 0.16170E−02,
A8 = 0.22523E−03, 10 = 0.20324E−04, A12 = −0.12724E−04

Tenth surface

K = −0.50000E+02, A4 = −0.13259E−01, A6 = −0.20743E−02,
A8 = −0.60084E−04, A10 = 0.32009E−04, A12 = 0.74047E−05

Eleventh surface

K = 0.50000E+02, A4 = −0.70729E−02, A6 = −0.27414E−03,
A8 = −0.34293E−03, A10 = −0.21340E−04, A12 = 0.93929E−05

Twelfth surface

K = −0.49133E+01, A4 = −0.25115E−01, A6 = 0.83069E−02,
A8 = −0.12487E−02, A10 = 0.23888E−03, A12 = −0.23584E−04,
A14 = −0.75274E−06, A16 = 0.13969E−06

Thirteenth surface

K = −0.10060E+02, A4 = −0.33977E−01, A6 = 0.51999E−02,
A8 = −0.27663E−03, A10 = −0.43742E−05, A12 = 0.16683E−05,
A14 = −0.94490E−07

Fourteenth surface

K = −0.46030E+01, A4 = −0.19760E−01, A6 = 0.32485E−02,
A8 = −0.40120E−03, A10 = 0.29223E−04, A12 = −0.10093E−05,
A14 = 0.10830E−07

Single lens data of the image pickup lens is as follows.

| Lens | First surface | Focal length (mm) |
|---|---|---|
| 1 | 2 | 6.097 |
| 2 | 5 | −12.776 |
| 3 | 7 | −6.611 |
| 4 | 9 | 7.619 |
| 5 | 11 | 2.089 |
| 6 | 13 | −2.373 |

Values corresponding to conditional expressions (1) to (6) are as follows.

(1) vd1 = 56.0
(2) vd2 = 23.4
(3) DL/f = 1.14
(4) f1/f = 1.31
(5) f45/f = 0.43
(6) L/2Y = 0.97

FIG. 1 is also a cross-sectional view of the image pickup lens 11 of Example 1. That is, the image pickup lens 11 is provided with the first lens L1 with convex shapes on both sides and having a positive refractive power, the second lens L2 having a negative refractive power and with a meniscus shape having a concave surface directed to the image side, the third lens L3 having a negative refractive power and with a meniscus shape having a concave surface directed to the image side, the fourth lens L4 having a positive refractive power and with a meniscus shape having a convex surface directed to the object side, the fifth lens L5 with convex shapes on both sides and having a positive refractive power, and the sixth lens L6 having a negative refractive power and with a meniscus shape having a concave surface directed to the image side. Note that symbol S indicates an aperture stop, and symbol I indicates an image pickup surface. Furthermore, symbol F means a parallel plate which is assumed to be an optical low-pass filter, an IR cut filter, a seal glass of the solid-state image sensor, or the like. FIG. 2 is an aberration diagram of Example 1 (spherical aberration, astigmatism, distortion aberration, and meridional comatic aberration).

Example 2

General specifications of an image pickup lens are as follows.

f = 4.67 mm
fB = 0.41 mm
F = 2.0
2Y = 7.128 mm
ENTP = 0.58 mm
EXTP = −3.47 mm
H1 = −0.38 mm
H2 = −4.26 mm

Surface data of the image pickup lens is as follows.

| S | R (mm) | D (mm) | Nd | vd | ER (mm) |
|---|---|---|---|---|---|
| 1 | infinite | 0.00 | | | 1.71 |
| 2* | 2.614 | 0.80 | 1.54470 | 56.2 | 1.43 |
| 3* | −20.783 | 0.00 | | | 1.22 |
| 4 (stop) | infinite | 0.05 | | | 1.08 |
| 5* | 3.852 | 0.30 | 1.58300 | 30.0 | 1.12 |

-continued

| | | | | | |
|---|---|---|---|---|---|
| 6* | 2.008 | 0.51 | | | 1.18 |
| 7* | 12.819 | 0.30 | 1.63200 | 23.4 | 1.25 |
| 8* | 3.762 | 0.10 | | | 1.48 |
| 9* | 2.856 | 0.75 | 1.54470 | 56.2 | 1.79 |
| 10* | 4.917 | 0.30 | | | 1.99 |
| 11* | 26.951 | 1.30 | 1.54470 | 56.2 | 2.13 |
| 12* | −1.122 | 0.16 | | | 2.33 |
| 13* | 10.020 | 0.50 | 1.54470 | 56.2 | 2.60 |
| 14* | 0.971 | 0.90 | | | 3.22 |
| 15 | infinite | 0.15 | 1.51630 | 64.1 | 3.53 |
| 16 | infinite | | | | 3.56 |

Note that all the lenses are formed of plastic material.
Aspherical surface coefficients are as follows.

Second surface

K = −0.38280E+00, A4 = 0.95493E−03, A6 = −0.10642E−02,
A8 = −0.33932E−02, A10 = 0.22394E−02, A12 = −0.96054E−03
Third surface K = −0.50000E+02, A4 = −0.24570E−01, A6 = 0.46239E−01,
A8 = −0.47052E−01, A10 = 0.20699E−01, A12 = −0.39872E−02
Fifth surface K = −0.35321E+02, A4 = −0.17573E−01, A6 = 0.36210E−01,
A8 = −0.26314E−01, A10 = 0.98134E−02, A12 = −0.13648E−02
Sixth surface K = −0.60810E+01, A4 = 0.11713E−02, A6 = 0.10770E−01,
A8 = −0.44240E−02, A10 = 0.79769E−04, A12 = −0.14811E−03
Seventh surface K = 0.23799E+02, A4 = −0.43291E−01, A6 = −0.89417E−03,
A8 = −0.93185E−02, A10 = 0.27375E−03, A12 = 0.73175E−03
Eighth surface K = −0.61204E+02, A4 = −0.11525E−01, A6 = −0.64675E−02,
A8 = 0.93472E−03, A10 = −0.11938E−02, A12 = 0.70803E−03
Ninth surface K = −0.31046E+02, A4 = −0.15640E−01, A6 = 0.48814E−02,
A8 = 0.72446E−04, A10 = −0.12230E−03, A12 = −0.61026E−05
Tenth surface K = −0.50000E+02, A4 = −0.26254E−01, A6 = −0.25466E−03,
A8 = −0.76684E−04, A10 = 0.29527E−04, A12 = 0.18154E−04
Eleventh surface K = 0.27007E+01, A4 = −0.28875E−01, A6 = 0.20412E−02,
A8 = 0.13345E−05, A10 = 0.47735E−04, A12 = 0.57661E−06
Twelfth surface K = −0.42362E+01, A4 = −0.45311E−01, A6 = 0.17104E−01,
A8 = −0.62334E−02, A10 = 0.20006E−02, A12 = −0.22821E−03,
A14 = −0.80034E−05, A16 = 0.19995E−05
Thirteenth surface K = −0.94346E+03, A4 = −0.61733E−01, A6 = 0.15354E−01,
A8 = −0.17532E−02, A10 = −0.72680E−05, A12 = 0.27751E−04,
A14 = −0.22794E−05
Fourteenth surface K = −0.55748E+01, A4 = −0.38593E−01, A6 = 0.10051E−01,
A8 = −0.18434E−02, A10 = 0.19395E−03, A12 = −0.10594E−04,
A14 = 0.22643E−06

Single lens data of the image pickup lens is as follows.

| Lens | First surface | Focal length (mm) |
|---|---|---|
| 1 | 2 | 4.315 |
| 2 | 5 | −7.651 |
| 3 | 7 | −8.535 |
| 4 | 9 | 11.086 |
| 5 | 11 | 2.010 |
| 6 | 13 | −2.014 |

Values corresponding to conditional expressions (1) to (6) are as follows.

(1) vd1 = 56.0
(2) vd2 = 30.0
(3) DL/f = 1.08
(4) f1/f = 0.92
(5) f45/f = 0.42
(6) L/2Y = 0.91

Figure 3:
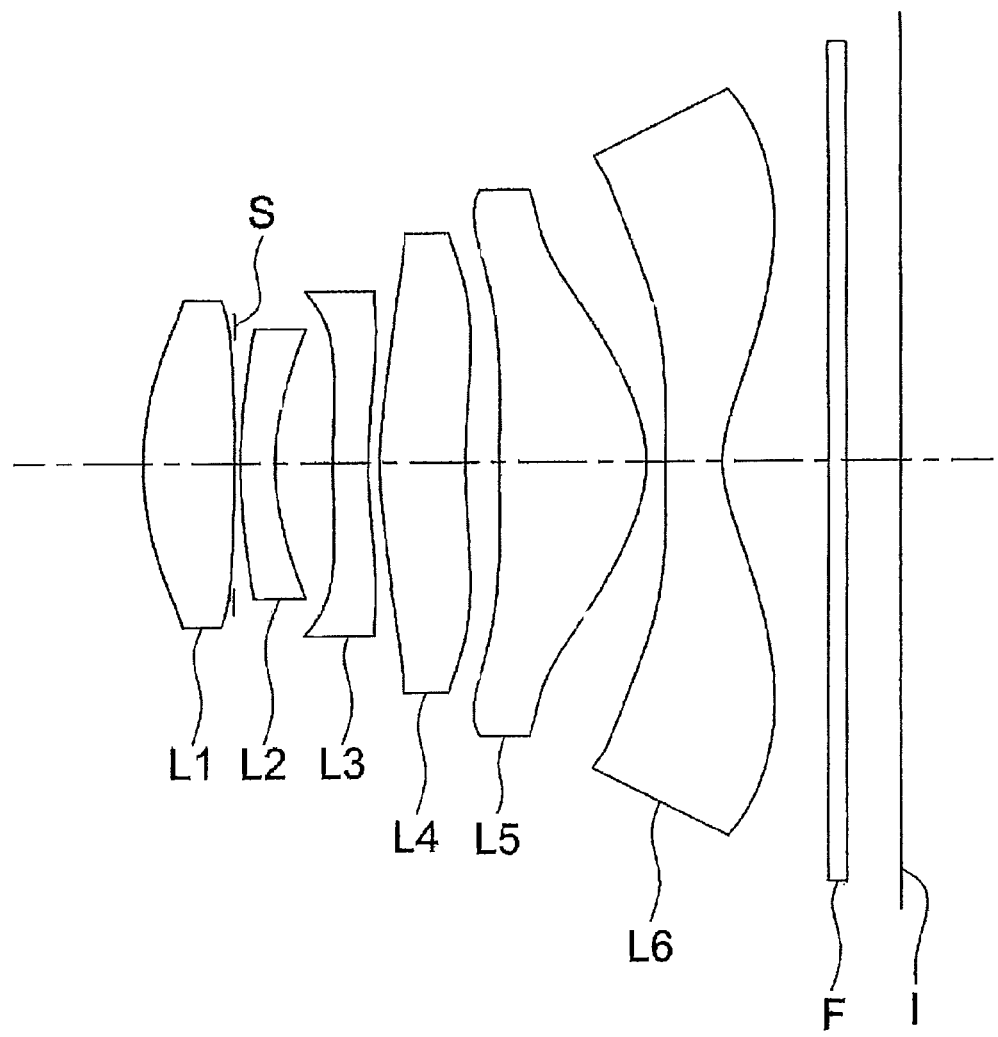
FIG. 3 is a cross-sectional view of a lens in Example 2.

FIG. 3 is a cross-sectional view of the lens of Example 2. Symbol L1 indicates the first lens with convex shapes on both sides and having a positive refractive power, symbol L2 indicates the second lens having a negative refractive power and with a meniscus shape having a concave surface directed to the image side, symbol L3 indicates the third lens having a negative refractive power and with a meniscus shape having a concave surface directed to the image side, symbol L4 indicates the fourth lens having a positive refractive power and with a meniscus shape having a concave surface directed to the image side, symbol L5 indicates the fifth lens with convex shapes on both sides and having a positive refractive power, symbol L6 indicates the sixth lens having a negative refractive power and with a meniscus shape having a concave surface directed to the image side, symbol S indicates an aperture stop, and symbol I indicates an image pickup surface. Furthermore, symbol F means a parallel plate which is assumed to be an optical low-pass filter, an IR cut filter, a seal glass of the solid-state image sensor, or the like. FIG. 4 is an aberration diagram of Example (spherical aberration, astigmatism, and distortion aberration).

Example 3

General specifications of an image pickup lens are as follows.

f = 4.67 mm
fB = 0.5 mm
F = 2.0
2Y = 7.128 mm
ENTP = 0.5 mm
EXTP = −3.74 mm
H1 = 0.03 mm
H2 = −4.17 mm

Surface data of the image pickup lens is as follows.

| S | R (mm) | D (mm) | Nd | vd | ER (mm) |
|---|---|---|---|---|---|
| 1 | infinite | 0.00 | | | 1.60 |
| 2* | 3.111 | 0.71 | 1.54470 | 56.2 | 1.38 |
| 3* | 1690.558 | 0.00 | | | 1.15 |
| 4 (stop) | infinite | 0.12 | | | 1.11 |
| 5* | 2.938 | 0.30 | 1.63200 | 23.4 | 1.19 |
| 6* | 1.995 | 0.55 | | | 1.26 |
| 7* | 9.199 | 0.30 | 1.63200 | 23.4 | 1.34 |
| 8* | 2.779 | 0.05 | | | 1.57 |
| 9* | 2.277 | 0.83 | 1.54470 | 56.2 | 1.83 |
| 10* | 5.061 | 0.34 | | | 2.03 |
| 11* | 19.273 | 1.29 | 1.54470 | 56.2 | 2.23 |
| 12* | −1.205 | 0.23 | | | 2.35 |
| 13* | 7.650 | 0.50 | 1.54470 | 56.2 | 2.61 |
| 14* | 1.029 | 0.90 | | | 3.27 |
| 15 | infinite | 0.15 | 1.51630 | 64.1 | 3.51 |
| 16 | infinite | | | | 3.54 |

-continued

Note that all the lenses are formed of plastic material.
Aspherical surface coefficients are as follows.

Second surface

K = −0.55270E+00, A4 = −0.39988E−04, A6 = −0.12388E−04,
A8 = −0.34779E−02, A10 = 0.22907E−02, A12 = −0.92168E−03

Third surface

K = −0.50000E+02, A4 = −0.32660E−01, A6 = 0.47584E−01,
A8 = −0.46232E−01, A10 = 0.20627E−01, A12 = −0.42392E−02

Fifth surface

K = −0.15669E+02, A4 = −0.19361E−01, A6 = 0.32629E−01,
A8 = −0.27174E−01, A10 = 0.95500E−02, A12 = −0.17348E−02

Sixth surface

K = −0.59448E+01, A4 = −0.18891E−02, A6 = 0.72199E−02,
A8 = −0.57825E−02, A10 = 0.36422E−04, A12 = −0.40598E−03

Seventh surface

K = 0.14616E+02, A4 = −0.45890E−01, A6 = 0.63222E−03,
A8 = −0.82220E−02, A10 = 0.20807E−03, A12 = 0.51658E−03

Eighth surface

K = −0.46423E+02, A4 = −0.13600E−01, A6 = −0.70241E−02,
A8 = 0.11429E−02, A10 = −0.11840E−02, A12 = 0.56765E−03

Ninth surface

K = −0.29243E+02, A4 = −0.15318E−01, A6 = 0.48632E−02,
A8 = −0.41812E−04, A10 = −0.12868E−03, A12 = 0.32209E−05

Tenth surface

K = −0.50000E+02, A4 = −0.25839E−01, A6 = −0.28947E−03,
A8 = −0.15505E−03, A10 = 0.24614E−04, A12 = 0.15486E−04

Eleventh surface

K = 0.49127E+02, A4 = −0.26044E−01, A6 = 0.18311E−02,
A8 = −0.73738E−04, A10 = 0.36435E−04, A12 = 0.22660E−05

Twelfth surface

K = −0.43517E+01, A4 = −0.41554E−01, A6 = 0.16849E−01,
A8 = −0.63460E−02, A10 = 0.19951E−02, A12 = −0.22696E−03,
A14 = −0.76649E−05, A16 = 0.20251E−05

Thirteenth surface

K = −0.21085E+02, A4 = −0.63390E−01, A6 = 0.15213E−01,
A8 = −0.17751E−02, A10 = −0.80500E−05, A12 = 0.27900E−04,
A14 = −0.22696E−05

Fourteenth surface

K = −0.46057E+01, A4 = −0.38373E−01, A6 = 0.10214E−01,
A8 = −0.18580E−02, A10 = 0.19349E−03, A12 = −0.10431E−04,
A14 = 0.21719E−06

Single lens data of the image pickup lens is as follows.

| Lens | First surface | Focal length (mm) |
|---|---|---|
| 1 | 2 | 5.721 |
| 2 | 5 | −11.221 |
| 3 | 7 | −6.416 |
| 4 | 9 | 6.880 |
| 5 | 11 | 2.129 |
| 6 | 13 | −2.243 |

Values corresponding to conditional expressions (1) to (6) are as follows.

(1) νd1 = 56.0
(2) νd2 = 23.4
(3) DL/f = 1.12
(4) f1/f = 1.23
(5) f45/f = 0.42
(6) L/2Y = 0.94

Figure 5:
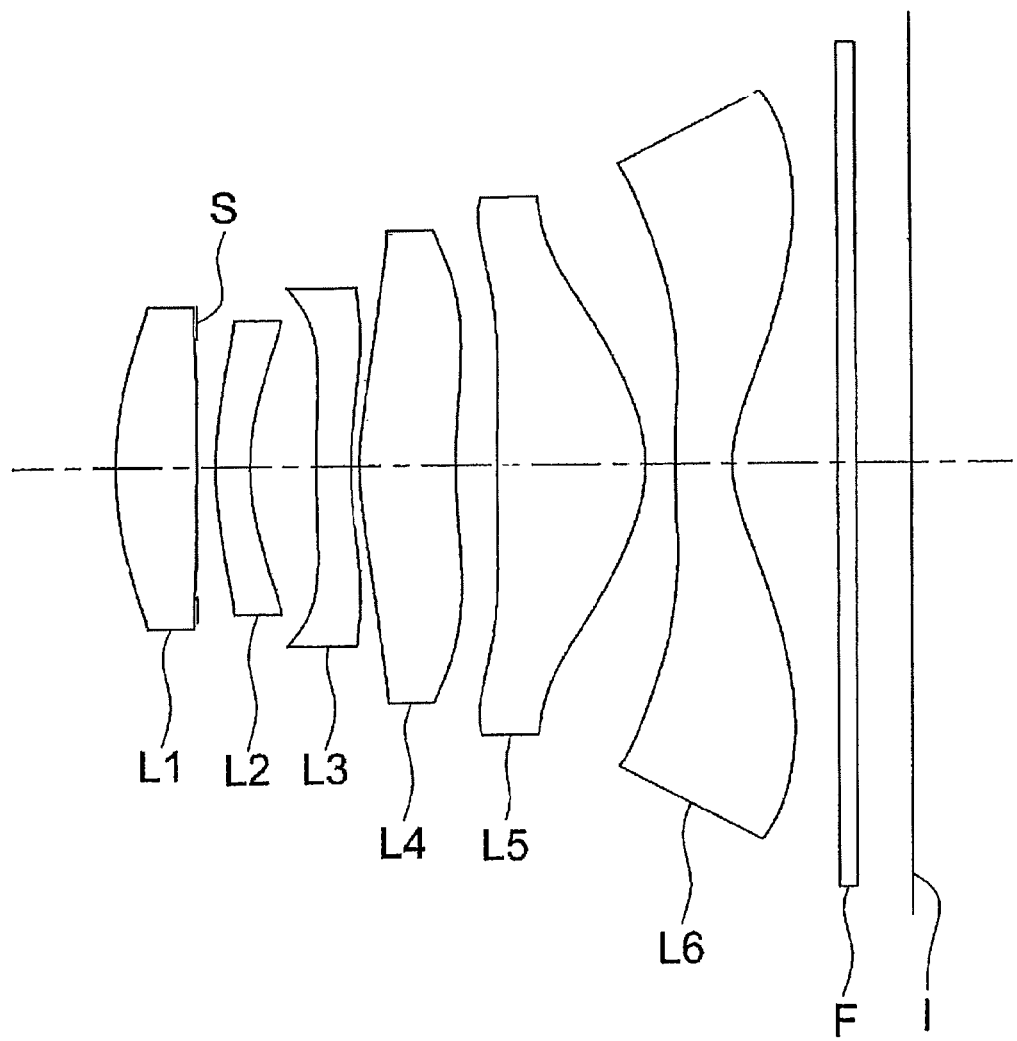
FIG. 5 is a cross-sectional view of a lens in Example 3.

FIG. 5 is a cross-sectional view of the lens of Example 3. Symbol L1 indicates the first lens having a positive refractive power and a meniscus shape having a convex surface directed to the object side, symbol L2 indicates the second lens having a negative refractive power and with a meniscus shape having a concave surface directed to the image side, symbol L3 indicates the third lens having a negative refractive power and with a meniscus shape having a concave surface directed to the image side, symbol L4 indicates the fourth lens having a positive refractive power and with a meniscus shape having a concave surface directed to the image side, symbol L5 indicates the fifth lens with convex shapes on both sides and a positive refractive power, symbol L6 indicates the sixth lens having a negative refractive power and with a meniscus shape having a concave surface directed to the image side, symbol S indicates an aperture stop, and symbol I indicates an image pickup surface. Furthermore, symbol F means a parallel plate which is assumed to be an optical low-pass filter, an IR cut filter, or a seal glass of the solid-state image sensor, or the like. FIG. 6 is an aberration diagram of Example 3 (spherical aberration, astigmatism, distortion aberration, and meridional comatic aberration).

Example 4

General specifications of an image pickup lens are as follows.

f = 4.35 mm
fB = 0.49 mm
F = 2.0
2Y = 7.128 mm
ENTP = 0.71 mm
EXTP = −3.93 mm
H1 = 0.78 mm
H2 = −3.85 mm

Surface data of the image pickup lens is as follows.

| S | R (mm) | D (mm) | Nd | νd | ER (mm) |
|---|---|---|---|---|---|
| 1 | infinite | 0.00 | | | 1.67 |
| 2* | 5.521 | 1.02 | 1.54470 | 56.2 | 1.54 |
| 3* | −8.148 | 0.00 | | | 1.19 |
| 4(stop) | infinite | 0.09 | | | 1.02 |
| 5* | 2.748 | 0.31 | 1.63200 | 23.4 | 1.13 |
| 6* | 1.835 | 0.49 | | | 1.24 |
| 7* | 8.016 | 0.30 | 1.63200 | 23.4 | 1.33 |
| 8* | 2.575 | 0.05 | | | 1.56 |
| 9* | 2.108 | 0.86 | 1.54470 | 56.2 | 1.82 |
| 10* | 5.111 | 0.34 | | | 1.98 |
| 11* | 15.383 | 1.29 | 1.54470 | 56.2 | 2.15 |
| 12* | −1.252 | 0.31 | | | 2.27 |
| 13* | 5.562 | 0.50 | 1.54470 | 56.2 | 2.59 |
| 14* | 1.068 | 0.90 | | | 3.26 |
| 15 | infinite | 0.15 | 1.51630 | 64.1 | 3.50 |
| 16 | infinite | | | | 3.53 |

Note that all the lenses are formed of plastic material.
Aspherical surface coefficients are as follows.

Second surface

K = −0.18530E+01, A4 = −0.16335E−02, A6 = 0.92276E−03,
A8 = −0.39844E−02, A10 = 0.22407E−02, A12 = −0.52625E−03

Third surface

K = −0.50000E+02, A4 = −0.31717E−01, A6 = 0.46874E−01,
A8 = −0.46065E−01, A10 = 0.21092E−01, A12 = −0.43138E−02

Fifth surface

K = −0.16563E+02, A4 = −0.19297E−01, A6 = 0.30719E−01,
A8 = −0.28695E−01, A10 = 0.92443E−02, A12 = −0.16473E−02

Sixth surface

K = −0.64813E+01, A4 = −0.98109E−02, A6 = 0.49764E−02,
A8 = −0.58013E−02, A10 = −0.80442E−04, A12 = −0.46162E−03

-continued

Seventh surface

K = 0.10792E+02, A4 = −0.47460E−01, A6 = 0.79463E−03,
A8 = −0.83587E−02, A10 = 0.17422E−03, A12 = 0.61547E−03
Eighth surface K = −0.37428E+02, A4 = −0.14489E−01, A6 = −0.72633E−02,
A8 = 0.98804E−03, A10 = −0.12490E−02, A12 = 0.53451E−03
Ninth surface K = −0.23882E+02, A4 = −0.15022E−01, A6 = 0.45824E−02,
A8 = −0.79460E−04, A10 = −0.11908E−03, A12 = 0.10122E−04
Tenth surface K = −0.46853E+02, A4 = −0.27299E−01, A6 = −0.63287E−03,
A8 = −0.19122E−03, A10 = 0.33500E−04, A12 = 0.20260E−04
Eleventh surface K = 0.41808E+02, A4 = −0.26425E−01, A6 = 0.18815E−02,
A8 = −0.78733E−04, A10 = 0.30782E−04, A12 = 0.50967E−06
Twelfth surface K = −0.40120E+01, A4 = −0.43012E−01, A6 = 0.17070E−01,
A8 = −0.63236E−02, A10 = 0.19992E−02, A12 = −0.22622E−03,
A14 = −0.76032E−05, A16 = 0.20144E−05
Thirteenth surface K = −0.97036E+01, A4 = −0.64042E−01, A6 = 0.14734E−01,
A8 = −0.17843E−02, A10 = −0.69839E−05, A12 = 0.28243E−04,
A14 = −0.22391E−05
Fourteenth surface K = −0.41187E+01, A4 = −0.39164E−01, A6 = 0.10195E−01,
A8 = −0.18686E−02, A10 = 0.19507E−03, A12 = −0.10375E−04,
A14 = 0.20728E−06

Single lens data of the image pickup lens is as follows.

| Lens | First surface | Focal length (mm) |
|---|---|---|
| 1 | 2 | 6.205 |
| 2 | 5 | −10.070 |
| 3 | 7 | −6.133 |
| 4 | 9 | 5.983 |
| 5 | 11 | 2.186 |
| 6 | 13 | −2.525 |

Values corresponding to conditional expressions (1) to (6) are as follows.

(1) vd1 = 56.0
(2) vd2 = 23.4
(3) DL/f = 1.28
(4) f1/f = 1.43
(5) f45/f = 0.45
(6) L/2Y = 0.99

Figure 7:
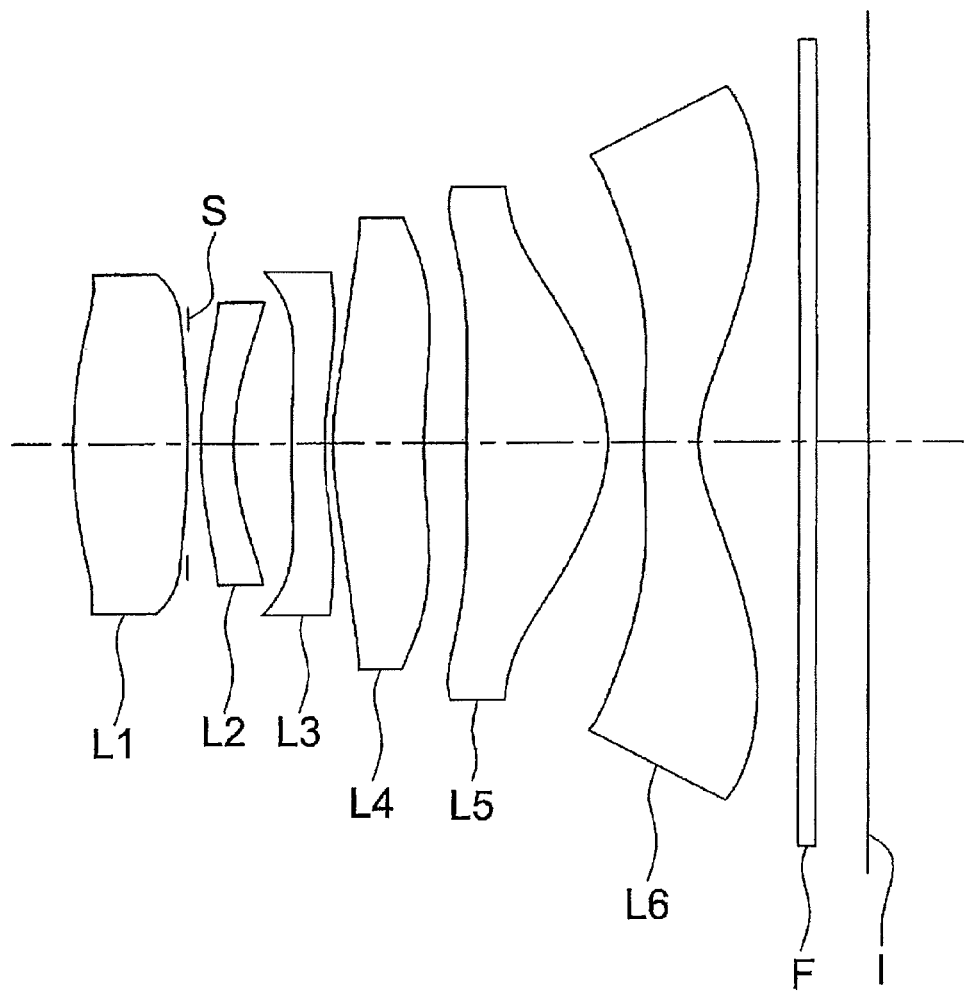
FIG. 7 is a cross-sectional view of a lens in Example 4.
Figure 8:
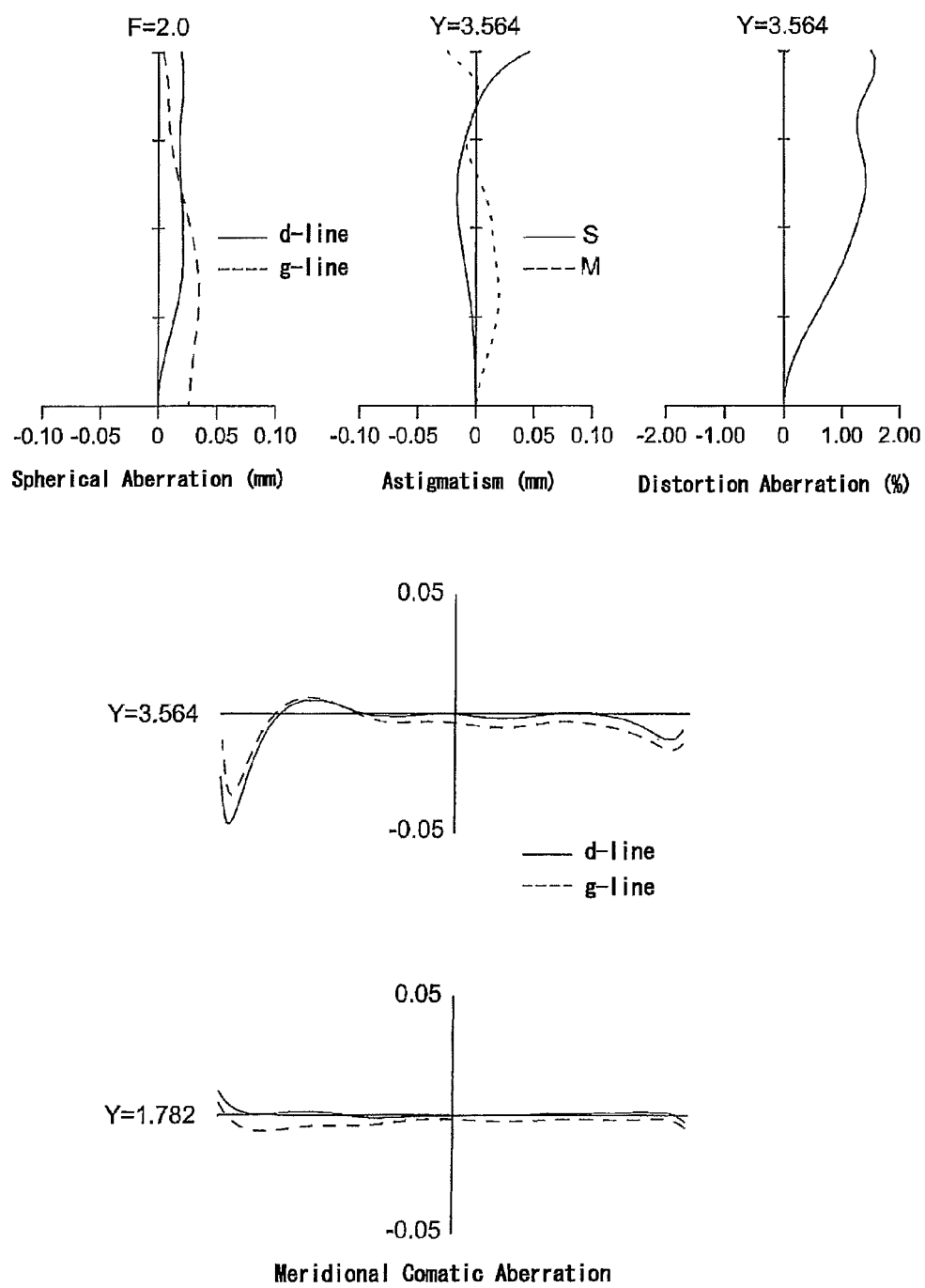
FIG. 8 is an aberration diagram of Example 4.

FIG. 7 is a cross-sectional view of the lens of Example 4. Symbol L1 indicates the first lens with convex shapes on both sides and having a positive refractive power, symbol L2 indicates the second lens having a negative refractive power and with a meniscus shape having a concave surface directed to the image side, symbol L3 indicates the third lens having a negative refractive power and with a meniscus shape having a concave surface directed to the image side, symbol L4 indicates the fourth lens having a positive refractive power and with a meniscus shape having a concave surface directed to the image side, symbol L5 indicates the fifth lens with convex shapes on both sides and having a positive refractive power, symbol L6 indicates the sixth lens having a negative refractive power and with a meniscus shape having a concave surface directed to the image side, symbol S indicates an aperture stop, and symbol I indicates an image pickup surface. Furthermore, symbol F means a parallel plate which is assumed to be an optical low-pass filter, an IR cut filter, a seal glass of the solid-state image sensor, or the like. FIG. 8 is an aberration diagram of Example 4 (spherical aberration, astigmatism, distortion aberration, and meridional comatic aberration).

Example 5

General specifications of an image pickup lens are as follows.

f = 4.67 mm
fB = 0.26 mm
F = 2.0
2Y = 7.128 mm
ENTP = 0 mm
EXTP = −4 mm
H1 = −0.46 mm
H2 = −4.42 mm

Surface data of the image pickup lens is as follows.

| S | R (mm) | D (mm) | Nd | νd | ER (mm) |
|---|---|---|---|---|---|
| 1(stop) | infinite | −0.14 | | | 1.17 |
| 2* | 3.439 | 0.71 | 1.54470 | 56.2 | 1.17 |
| 3* | −31.918 | 0.13 | | | 1.30 |
| 4* | 3.470 | 0.30 | 1.63200 | 23.4 | 1.39 |
| 5* | 2.183 | 0.42 | | | 1.48 |
| 6* | 8.569 | 0.30 | 1.63200 | 23.4 | 1.52 |
| 7* | 4.226 | 0.21 | | | 1.64 |
| 8* | 2.893 | 0.87 | 1.54470 | 56.2 | 1.95 |
| 9* | 7.253 | 0.67 | | | 2.10 |
| 10* | 80.011 | 1.10 | 1.54470 | 56.2 | 2.22 |
| 11* | −1.492 | 0.27 | | | 2.45 |
| 12* | 5.816 | 0.56 | 1.54470 | 56.2 | 2.99 |
| 13* | 1.088 | 0.90 | | | 3.47 |
| 14 | infinite | 0.15 | 1.51630 | 64.1 | 3.63 |
| 15 | infinite | | | | 3.66 |

Note that all the lenses are formed of plastic material.
Aspherical surface coefficients are as follows.

Second surface

K = −0.81774E+00, A4 = −0.71594E−03, A6 = −0.70065E−03,
A8 = −0.13630E−02, A10 = 0.56929E−03, A12 = −0.42468E−03
Third surface K = 0.25292E+01, A4 = −0.19136E−01, A6 = 0.21587E−01,
A8 = −0.17803E−01, A10 = 0.49797E−02, A12 = −0.69121E−03
Fourth surface K = −0.21080E+02, A4 = −0.18895E−01, A6 = 0.13629E−01,
A8 = −0.10148E−01, A10 = 0.23983E−02, A12 = −0.32605E−03
Fifth surface K = −0.65385E+01, A4 = −0.73281E−02, A6 = 0.11618E−02,
A8 = −0.25088E−02, A10 = −0.81561E−04, A12 = −0.10402E−03
Sixth surface K = 0.16967E+02, A4 = −0.26719E−01, A6 = −0.87837E−05,
A8 = −0.24892E−02, A10 = 0.23474E−03, A12 = 0.11045E−03
Seventh surface K = −0.40594E+02, A4 = −0.64933E−02, A6 = −0.20081E−02,
A8 = 0.61690E−03, A10 = −0.24134E−03, A12 = 0.15230E−03
Eighth surface K = −0.13432E+02, A4 = −0.62243E−02, A6 = 0.17421E−02,
A8 = −0.80154E−04, A10 = −0.27008E−04, A12 = −0.20229E−05
Ninth surface K = −0.41679E+02, A4 = −0.17566E−01, A6 = 0.16915E−04,
A8 = −0.56958E−04, A10 = 0.10495E−05, A12 = 0.29234E−05
Tenth surface K = 0.50000E+02, A4 = −0.14603E−01, A6 = −0.29355E−03,
A8 = −0.15612E−03, A10 = 0.52825E−05, A12 = 0.21417E−05

Eleventh surface

K = −0.46063E+01, A4 = −0.24679E−01, A6 = 0.82317E−02,
A8 = −0.22838E−02, A10 = 0.51497E−03, A12 = −0.45440E−04,
A14 = −0.11070E−05, A16 = 0.25759E−06

Twelfth surface

K = −0.10879E+03, A4 = −0.40036E−01, A6 = 0.76242E−02,
A8 = −0.62686E−03, A10 = −0.53377E−05, A12 = 0.52119E−05,
A14 = −0.26535E−06

Thirteenth surface

K = −0.44787E+01, A4 = −0.23968E−01, A6 = 0.44986E−02,
A8 = −0.57475E−03, A10 = 0.40715E−04, A12 = −0.15520E−05,
A14 = 0.27815E−07

Single lens data of the image pickup lens is as follows.

| Lens | First surface | Focal length (mm) |
|---|---|---|
| 1 | 2 | 5.740 |
| 2 | 4 | −10.231 |
| 3 | 6 | −13.557 |
| 4 | 8 | 8.254 |
| 5 | 10 | 2.703 |
| 6 | 12 | −2.563 |

Values corresponding to conditional expressions (1) to (6) are as follows.

(1) νd1 = 56.0
(2) νd2 = 23.4
(3) DL/f = 1.18
(4) f1/f = 1.23
(5) f45/f = 0.53
(6) L/2Y = 0.95

Figure 9:
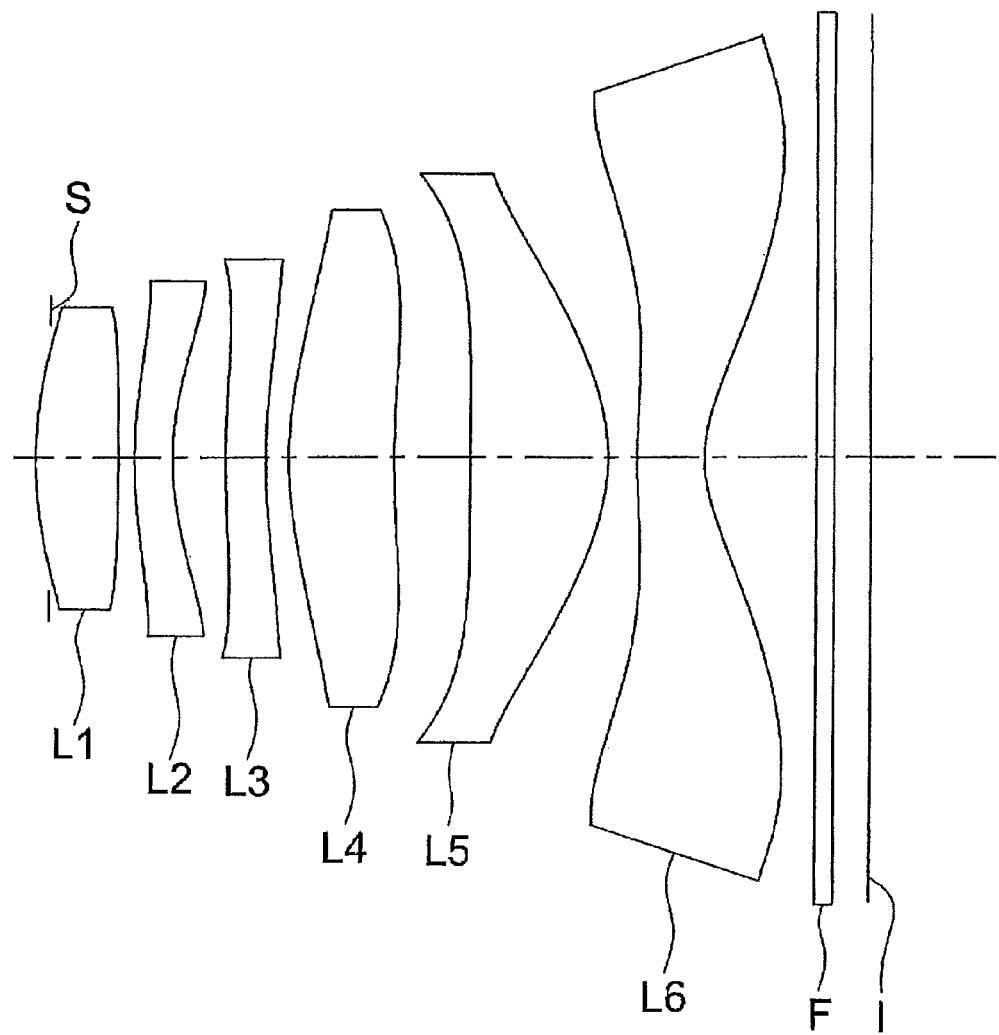
FIG. 9 is a cross-sectional view of a lens in Example 5.

FIG. 9 is a cross-sectional view of the lens of Example 5. Symbol L1 indicates the first lens with convex shapes on both sides and a positive refractive power, symbol L2 indicates the second lens having a negative refractive power and with a meniscus shape having a concave surface directed to the image side, symbol L3 indicates the third lens having a negative refractive power and with a meniscus shape having a concave surface directed to the image side, symbol L4 indicates the fourth lens having a positive refractive power and with a meniscus shape having a concave surface directed to the image side, symbol L5 indicates the fifth lens with convex shapes on both sides and having a positive refractive power, symbol L6 indicates the sixth lens having a negative refractive power and with a meniscus shape having a concave surface directed to the image side, symbol S indicates an aperture stop, and symbol I indicates an image pickup surface. Furthermore, symbol F means a parallel plate which is assumed to be an optical low-pass filter, an IR cut filter, a seal glass of the solid-state image sensor, or the like. FIG. 10 is an aberration diagram of Example 5 (spherical aberration, astigmatism, distortion aberration, and meridional comatic aberration).

Example 6

General specifications of an image pickup lens are as follows.

f = 4.71 mm
fB = 0.34 mm
F = 1.8
2Y = 7.128 mm
ENTP = 0 mm
EXTP = −3.29 mm
H1 = −1.41 mm
H2 = −4.37 mm

Surface data of the image pickup lens is as follows.

| S | R (mm) | D (mm) | Nd | νd | ER (mm) |
|---|---|---|---|---|---|
| 1(stop) | infinite | −0.31 | | | 1.31 |
| 2* | 2.347 | 0.85 | 1.54470 | 56.2 | 1.34 |
| 3* | 37.567 | 0.05 | | | 1.40 |
| 4* | 3.725 | 0.25 | 1.63200 | 23.4 | 1.41 |
| 5* | 2.149 | 0.42 | | | 1.40 |
| 6* | 7.764 | 0.26 | 1.63200 | 23.4 | 1.42 |
| 7* | 3.271 | 0.11 | | | 1.47 |
| 8* | 2.114 | 0.64 | 1.54470 | 56.2 | 1.68 |
| 9* | 4.021 | 0.55 | | | 1.93 |
| 10* | −14.016 | 0.82 | 1.54470 | 56.2 | 2.01 |
| 11* | −1.240 | 0.27 | | | 2.31 |
| 12* | 8.692 | 0.40 | 1.54470 | 56.2 | 2.91 |
| 13* | 1.056 | 0.90 | | | 3.18 |
| 14 | infinite | 0.15 | 1.51630 | 64.1 | 3.57 |
| 15 | infinite | | | | 3.60 |

Note that all the lenses are formed of plastic material.
Aspherical surface coefficients are as follows.

Second surface

K = −0.24663E+00, A4 = 0.20986E−02, A6 = −0.51959E−03,
A8 = −0.95546E−03, A10 = 0.80186E−03, A12 = −0.63280E−03

Third surface

K = −0.50000E+02, A4 = −0.19845E−01, A6 = 0.19081E−01,
A8 = −0.17908E−01, A10 = 0.54853E−02, A12 = −0.75060E−03

Fourth surface

K = −0.24132E+02, A4 = −0.26800E−01, A6 = 0.12416E−01,
A8 = −0.98479E−02, A10 = 0.27763E−02, A12 = 0.17506E−03

Fifth surface

K = −0.61465E+01, A4 = −0.42299E−02, A6 = 0.18168E−02,
A8 = −0.26897E−02, A10 = 0.25120E−04, A12 = 0.14412E−03

Sixth surface

K = 0.13489E+02, A4 = −0.24935E−01, A6 = −0.36411E−02,
A8 = −0.20570E−02, A10 = 0.90220E−03, A12 = 0.64139E−04

Seventh surface

K = −0.60677E+02, A4 = −0.11348E−01, A6 = −0.14969E−02,
A8 = 0.60550E−03, A10 = 0.13385E−03, A12 = 0.67664E−03

Eighth surface

K = −0.18213E+02, A4 = −0.12824E−01, A6 = 0.36236E−03,
A8 = 0.48549E−03, A10 = 0.11746E−03, A12 = −0.95626E−04

Ninth surface

K = −0.17631E+02, A4 = −0.16777E−01, A6 = 0.43721E−03,
A8 = 0.86839E−04, A10 = −0.49731E−04, A12 = −0.34650E−04

Tenth surface

K = 0.46186E+01, A4 = −0.59148E−02, A6 = −0.11433E−02,
A8 = −0.23765E−03, A10 = −0.60353E−04, A12 = 0.29972E−05

Eleventh surface

K = −0.46955E+01, A4 = −0.20722E−01, A6 = 0.10003E−01,
A8 = −0.22420E−02, A10 = 0.49566E−03, A12 = −0.49486E−04,
A14 = −0.15071E−05, A16 = 0.26624E−06

Twelfth surface

K = −0.94141E+03, A4 = −0.40626E−01, A6 = 0.80147E−02,
A8 = −0.60411E−03, A10 = −0.72696E−05, A12 = 0.49373E−05,
A14 = −0.26230E−06

Thirteenth surface

K = −0.65111E+01, A4 = −0.30753E−01, A6 = 0.51341E−02,
A8 = −0.62877E−03, A10 = 0.38003E−04, A12 = −0.15431E−05,
A14 = 0.62675E−07

-continued

Single lens data of the image pickup lens is as follows.

| Lens | First surface | Focal length (mm) |
|---|---|---|
| 1 | 2 | 4.557 |
| 2 | 4 | −8.566 |
| 3 | 6 | −9.147 |
| 4 | 8 | 7.322 |
| 5 | 10 | 2.443 |
| 6 | 12 | −2.248 |

Values corresponding to conditional expressions (1) to (6) are as follows.

(1) vd1 = 56.0
(2) vd2 = 23.4
(3) DL/f = 0.98
(4) f1/f = 0.97
(5) f45/f = 0.47
(6) L/2Y = 0.83

Figure 11:
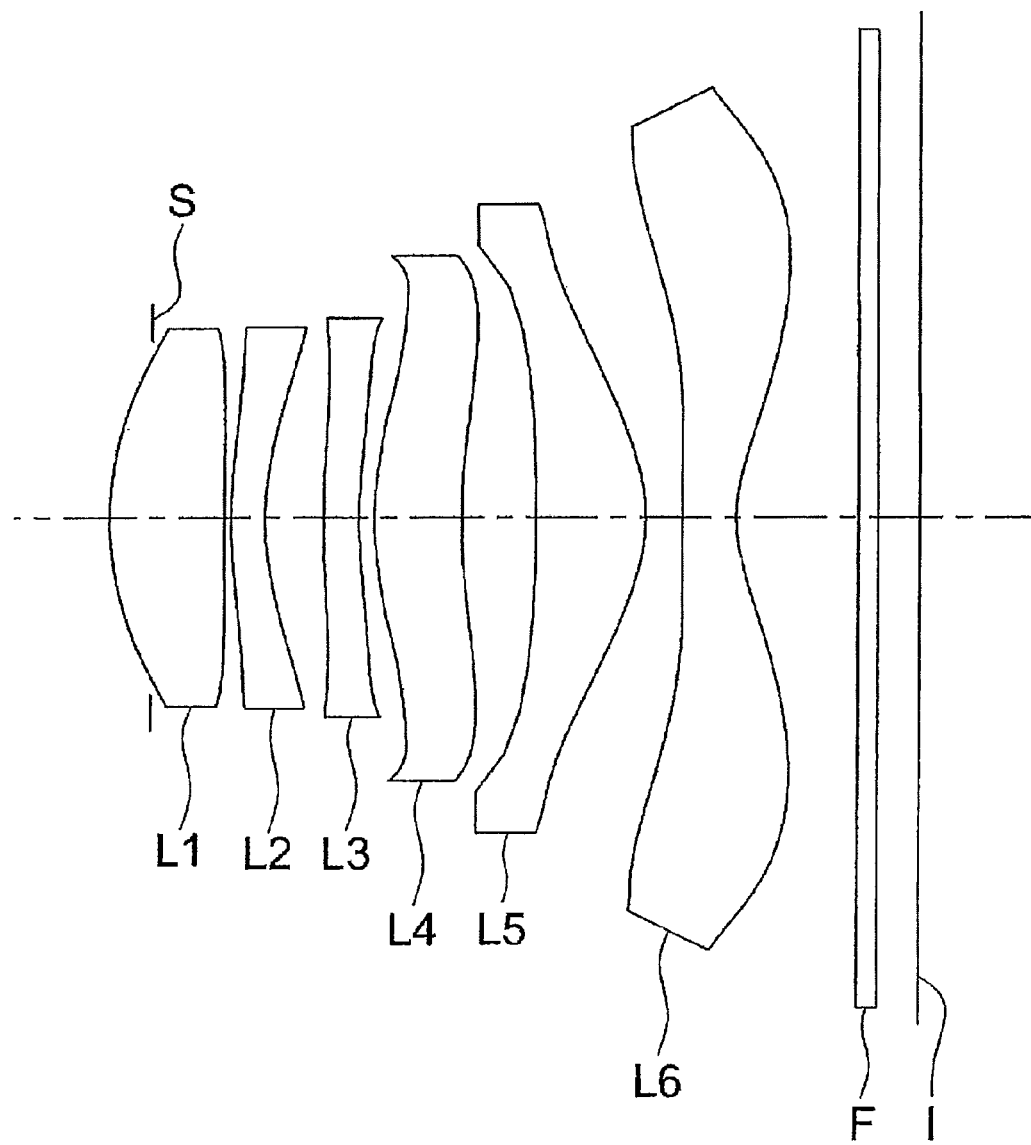
FIG. 11 is a cross-sectional view of a lens in Example 6.

FIG. 11 is a cross-sectional view of the lens of Example 6. Symbol L1 indicates the first lens having a positive refractive power and with a meniscus shape having a convex surface directed to the object side, symbol L2 indicates the second lens having a negative refractive power and with a meniscus shape having a concave surface directed to the image side, symbol L3 indicates the third lens having a negative refractive power and with a meniscus shape having a concave surface directed to the image side, symbol L4 indicates the fourth lens having a positive refractive power and with a meniscus shape having a concave surface directed to the image side, symbol L5 indicates the fifth lens having a positive refractive power and with a meniscus shape having a convex surface directed to the image side, symbol L6 indicates the sixth lens having a negative refractive power and with a meniscus shape having a concave surface directed to the image side, symbol S indicates an aperture stop, and symbol I indicates an image pickup surface. Furthermore, symbol F means a parallel plate which is assumed to be an optical low-pass filter, an IR cut filter, a seal glass of the solid-state image sensor, or the like. FIG. 12 is an aberration diagram of Example 6 (spherical aberration, astigmatism, distortion aberration, and meridional comatic aberration).

Example 7

General specifications of an image pickup lens are as follows.

f = 5.21 mm
fB = 1.01 mm
F = 2.0
2Y = 7.128 mm
ENTP = 0 mm
EXTP = −4.03 mm
H1 = −0.18 mm
H2 = −4.2 mm

Surface data of the image pickup lens is as follows.

| S | R (mm) | D (mm) | Nd | vd | ER (mm) |
|---|---|---|---|---|---|
| 1(stop) | infinite | −0.23 | | | 1.30 |
| 2* | 2.797 | 0.79 | 1.54470 | 56.2 | 1.41 |
| 3* | −36.787 | 0.08 | | | 1.48 |
| 4* | 2.659 | 0.30 | 1.63200 | 23.4 | 1.51 |
| 5* | 1.720 | 0.62 | | | 1.53 |
| 6* | 9.377 | 0.28 | 1.63200 | 23.4 | 1.56 |
| 7* | 5.646 | 0.27 | | | 1.63 |
| 8* | 8.112 | 0.84 | 1.54470 | 56.2 | 1.98 |
| 9* | 4.384 | 0.17 | | | 2.16 |
| 10* | 13.225 | 0.92 | 1.54470 | 56.2 | 2.22 |
| 11* | −1.112 | 0.10 | | | 2.44 |
| 12* | 3.666 | 0.43 | 1.54470 | 56.2 | 2.77 |
| 13* | 0.896 | 0.90 | | | 3.08 |
| 14 | infinite | 0.15 | 1.51630 | 64.1 | 3.38 |
| 15 | infinite | | | | 3.40 |

Note that all the lenses are formed of plastic material.
Aspherical surface coefficients are as follows.

Second surface

K = −0.32031E+00, A4 = 0.21931E−02, A6 = −0.85024E−03,
A8 = −0.15149E−02, A10 = 0.12539E−02, A12 = −0.62370E−03
Third surface K = −0.15712E+02, A4 = −0.14633E−01, A6 = 0.19738E−01,
A8 = −0.17361E−01, A10 = 0.54856E−02, A12 = −0.87755E−03
Fourth surface K = −0.10083E+02, A4 = −0.18935E−01, A6 = 0.13987E−01,
A8 = −0.11393E−01, A10 = 0.22299E−02, A12 = 0.77526E−04
Fifth surface K = −0.41479E+01, A4 = 0.52794E−02, A6 = 0.13267E−02,
A8 = −0.26069E−02, A10 = 0.11362E−03, A12 = 0.37123E−04
Sixth surface K = −0.19597E+02, A4 = −0.30462E−01, A6 = −0.31842E−02,
A8 = −0.78711E−03, A10 = 0.13449E−02, A12 = −0.76426E−04
Seventh surface K = −0.17362E+02, A4 = −0.26732E−01, A6 = −0.41118E−02,
A8 = 0.18139E−02, A10 = −0.17611E−03, A12 = 0.29369E−03
Eighth surface K = −0.30000E+02, A4 = −0.26324E−01, A6 = 0.51254E−02,
A8 = −0.20517E−03, A10 = 0.10001E−03, A12 = −0.17123E−04
Ninth surface K = −0.21621E+02, A4 = −0.19178E−01, A6 = −0.18855E−02,
A8 = −0.70819E−03, A10 = 0.11499E−04, A12 = 0.20357E−04
Tenth surface K = 0.30000E+02, A4 = −0.45519E−02, A6 = −0.36707E−02,
A8 = −0.34115E−03, A10 = 0.80990E−05, A12 = 0.98410E−05
Eleventh surface K = −0.55296E+01, A4 = −0.28693E−01, A6 = 0.11687E−01,
A8 = −0.21557E−02, A10 = 0.48460E−03, A12 = −0.52305E−04,
A14 = −0.15443E−05,
A16 = 0.37189E−06
Twelfth surface K = −0.10487E+02, A4 = −0.56451E−01, A6 = 0.81336E−02,
A8 = −0.48720E−03, A10 = 0.27141E−05, A12 = 0.50363E−05,
A14 = −0.43964E−06
Thirteenth surface K = −0.50680E+01, A4 = −0.37386E−01, A6 = 0.59974E−02,
A8 = −0.72920E−03, A10 = 0.45597E−04, A12 = −0.12092E−05,
A14 = 0.10773E−07

Single lens data of the image pickup lens is as follows.

| Lens | First surface | Focal length (mm) |
|---|---|---|
| 1 | 2 | 4.806 |
| 2 | 4 | −8.792 |
| 3 | 6 | −23.134 |
| 4 | 8 | −19.027 |
| 5 | 10 | 1.926 |
| 6 | 12 | −2.304 |

-continued

Values corresponding to conditional expressions (1) to (6) are as follows.

(1) vd1 = 56.0
(2) vd2 = 23.4
(3) DL/f = 0.92
(4) f1/f = 0.92
(5) f45/f = 0.42
(6) L/2Y = 0.95

Figure 13:
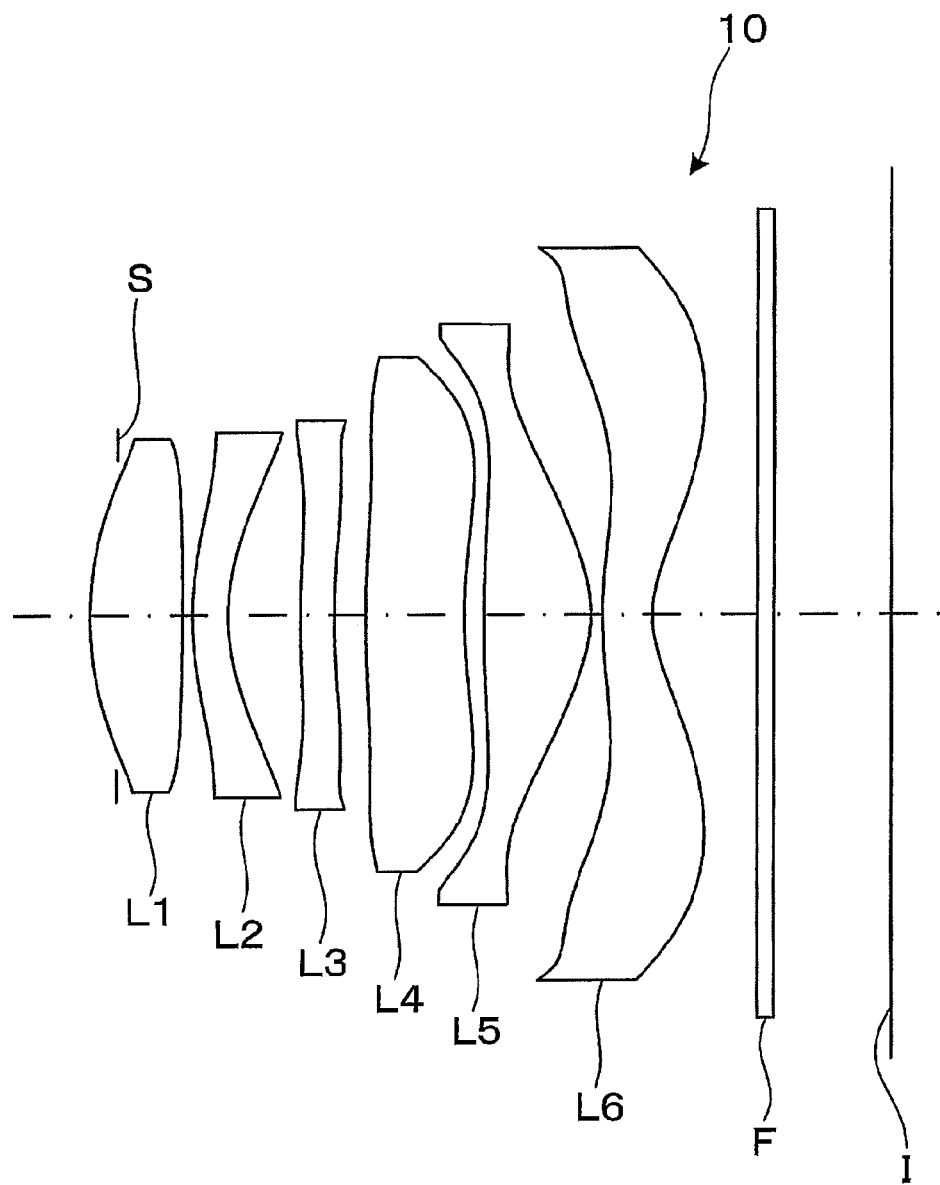
FIG. 13 is a cross-sectional view of a lens in Example 7.
Figure 14:
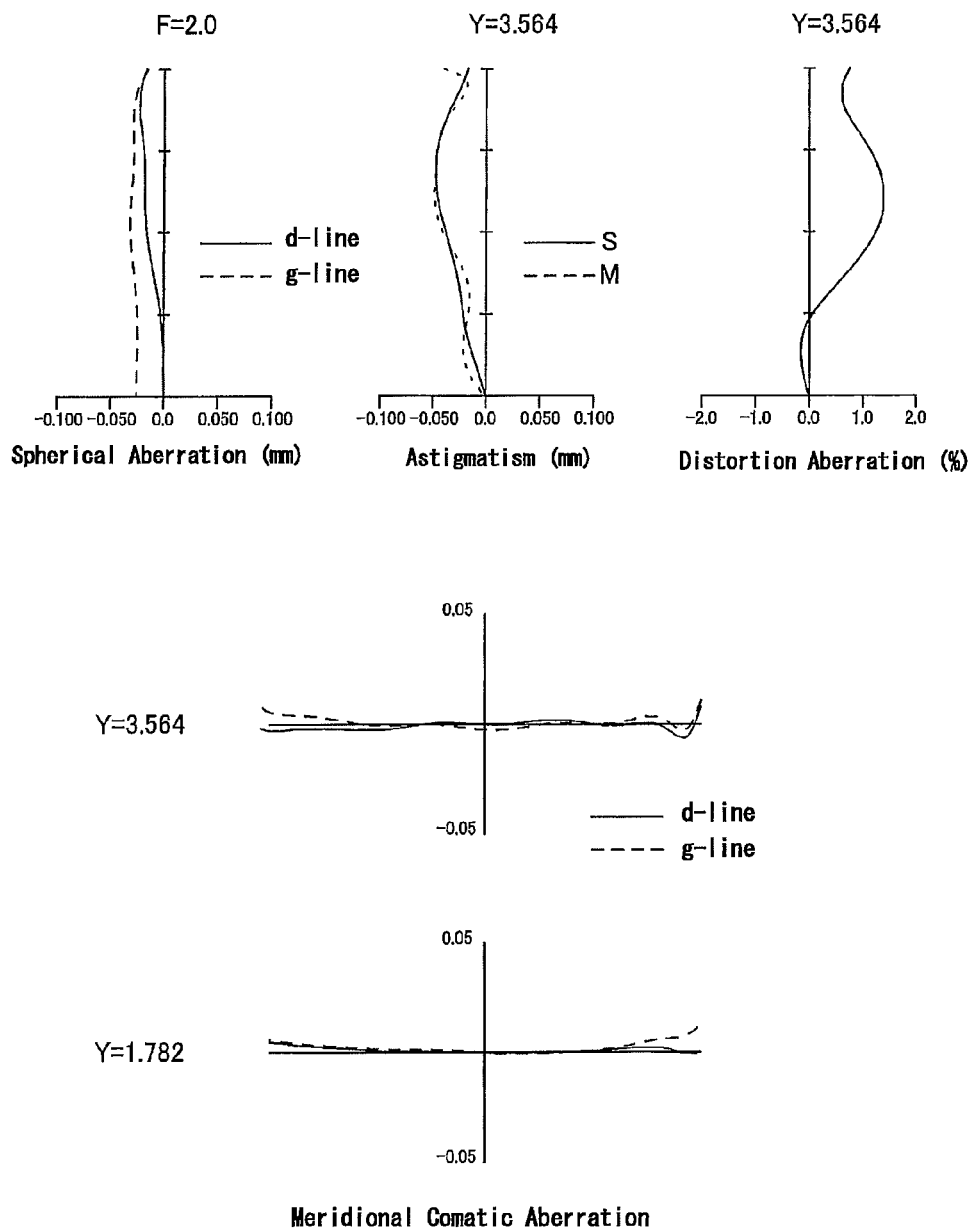
FIG. 14 is an aberration diagram of Example 7.

FIG. 13 is a cross-sectional view of the lens of Example 7. Symbol L1 indicates the first lens with convex shapes on both sides and having a positive refractive power, symbol L2 indicates the second lens having a negative refractive power and with a meniscus shape having a concave surface directed to the image side, symbol L3 indicates the third lens having a negative refractive power and with a meniscus shape having a concave surface directed to the image side, symbol L4 indicates the fourth lens having a negative refractive power and with a meniscus shape having a concave surface directed to the image side, symbol L5 indicates the fifth lens with convex shapes on both sides and having a positive refractive power, symbol L6 indicates the sixth lens having a negative refractive power and with a meniscus shape having a concave surface directed to the image side, symbol S indicates an aperture stop, and symbol I indicates an image pickup surface. Furthermore, symbol F means a parallel plate which is assumed to be an optical low-pass filter, an IR cut filter, a seal glass of the solid-state image sensor, or the like. FIG. 14 is an aberration diagram of Example 7 (spherical aberration, astigmatism, distortion aberration, and meridional comatic aberration).

Example 8

General specifications of an image pickup lens are as follows.

f = 4.73 mm
fB = 0.45 mm
F = 2.0
2Y = 7.128 mm
ENTP = 0.55 mm
EXTP = −3.77 mm
H1 = −0.02 mm
H2 = −4.28 mm

Surface data of the image pickup lens is as follows.

| S | R (mm) | D (mm) | Nd | vd | ER (mm) |
|---|---|---|---|---|---|
| 1 | infinite | 0.00 | | | 1.67 |
| 2* | 3.194 | 0.70 | 1.54470 | 56.2 | 1.45 |
| 3* | −284.220 | 0.05 | | | 1.26 |
| 4(stop) | infinite | 0.15 | | | 1.09 |
| 5* | 2.909 | 0.30 | 1.63200 | 23.4 | 1.21 |
| 6* | 1.970 | 0.58 | | | 1.29 |
| 7* | 8.916 | 0.36 | 1.63200 | 23.4 | 1.37 |
| 8* | 13.014 | 0.11 | | | 1.58 |
| 9* | 11.952 | 0.68 | 1.54470 | 56.2 | 1.83 |
| 10* | 6.548 | 0.28 | | | 2.05 |
| 11* | 13.893 | 1.47 | 1.54470 | 56.2 | 2.29 |
| 12* | −1.140 | 0.20 | | | 2.40 |
| 13* | 22.824 | 0.50 | 1.54470 | 56.2 | 2.61 |
| 14* | 1.032 | 0.90 | | | 3.29 |
| 15 | infinite | 0.15 | 1.51630 | 64.1 | 3.52 |
| 16 | infinite | | | | 3.55 |

-continued

Note that all the lenses are formed of plastic material.
Aspherical surface coefficients are as follows.

Second surface

K = −0.74779E+00, A4 = −0.10143E−02, A6 = 0.37393E−03,
A8 = −0.34308E−02, A10 = 0.23044E−02, A12 = −0.86461E−03
Third surface K = −0.30000E+02, A4 = −0.32328E−01, A6 = 0.47455E−01,
A8 = −0.46042E−01, A10 = 0.20777E−01, A12 = −0.41391E−02
Fifth surface K = −0.16279E+02, A4 = −0.19889E−01, A6 = 0.32816E−01,
A8 = −0.26794E−01, A10 = 0.97279E−02, A12 = −0.18648E−02
Sixth surface K = −0.65574E+01, A4 = −0.16311E−02, A6 = 0.77612E−02,
A8 = −0.58807E−02, A10 = −0.78165E−04, A12 = −0.37305E−03
Seventh surface K = 0.15502E+02, A4 = −0.45053E−01, A6 = −0.13152E−03,
A8 = −0.83960E−02, A10 = 0.24674E−03, A12 = 0.55103E−03
Eighth surface K = −0.46563E+02, A4 = −0.13476E−01, A6 = −0.70096E−02,
A8 = 0.10210E−02, A10 = −0.12235E−02, A12 = 0.56858E−03
Ninth surface K = −0.78886E+01, A4 = −0.13908E−01, A6 = 0.49928E−02,
A8 = −0.41628E−04, A10 = −0.14957E−03, A12 = −0.78245E−05
Tenth surface K = −0.30000E+02, A4 = −0.25864E−01, A6 = −0.49946E−04,
A8 = −0.17586E−03, A10 = 0.17522E−04, A12 = 0.15551E−04
Eleventh surface K = 0.26766E+02, A4 = −0.25593E−01, A6 = 0.17156E−02,
A8 = −0.84131E−04, A10 = 0.34945E−04, A12 = 0.17688E−05
Twelfth surface K = −0.41063E+01, A4 = −0.41350E−01, A6 = 0.16844E−01,
A8 = −0.63509E−02, A10 = 0.19941E−02, A12 = −0.22716E−03,
A14 = −0.77122E−05, A16 = 0.20126E−05
Thirteenth surface K = 0.41577E+02, A4 = −0.60355E−01, A6 = 0.15363E−01,
A8 = −0.17897E−02, A10 = −0.10836E−04, A12 = 0.27660E−04,
A14 = −0.22728E−05
Fourteenth surface K = −0.49545E+01, A4 = −0.35936E−01, A6 = 0.99857E−02,
A8 = −0.18569E−02, A10 = 0.19384E−03, A12 = −0.10410E−04,
A14 = 0.21712E−06

Single lens data of the image pickup lens is as follows.

| Lens | First surface | Focal length (mm) |
|---|---|---|
| 1 | 2 | 5.804 |
| 2 | 5 | −11.024 |
| 3 | 7 | 43.310 |
| 4 | 9 | −27.821 |
| 5 | 11 | 2.004 |
| 6 | 13 | −2.001 |

Values corresponding to conditional expressions (1) to (6) are as follows.

(1) vd1 = 56.0
(2) vd2 = 23.4
(3) DL/f = 1.14
(4) f1/f = 1.23
(5) f45/f = 0.46
(6) L/2Y = 0.95

Figure 15:
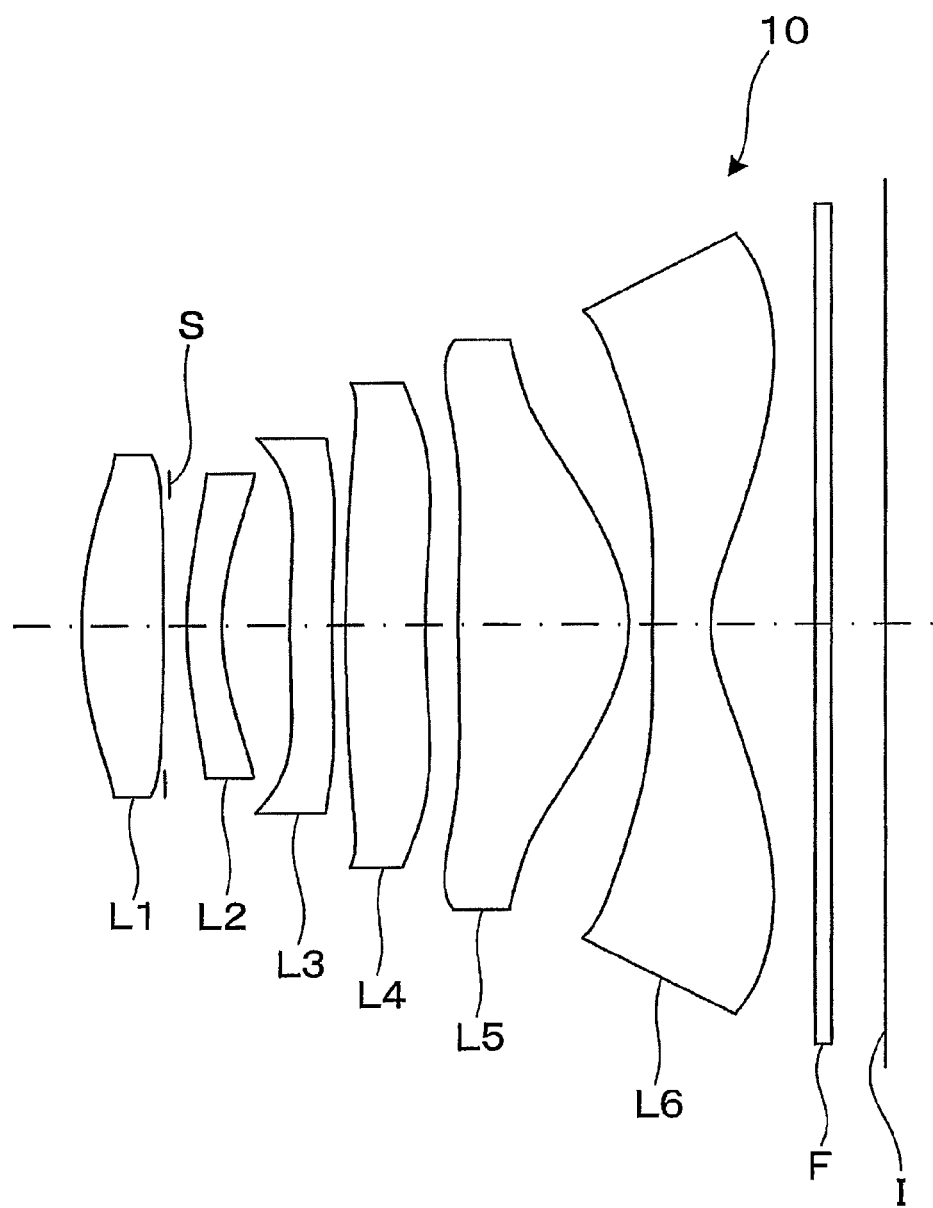
FIG. 15 is a cross-sectional view of a lens in Example 8.

FIG. 15 is a cross-sectional view of the lens of Example 8. Symbol L1 indicates the first lens with convex shapes on both sides and having a positive refractive power, symbol L2 indicates the second lens having a negative refractive power and with a meniscus shape having a concave surface directed to the image side, symbol L3 indicates the third lens having a positive refractive power and with a meniscus shape having a concave surface directed to the image side, symbol L4 indicates the fourth lens having a negative refractive power and with a meniscus shape having a concave surface directed to the image side, symbol L5 indicates the fifth lens with convex shapes on both sides and having a positive refractive power, symbol L6 indicates the sixth lens having a negative refractive power and with a meniscus shape having a concave surface directed to the image side, symbol S indicates an aperture stop, and symbol I indicates an image pickup surface. Furthermore, symbol F means a parallel plate which is assumed to be an optical low-pass filter, an IR cut filter, a seal glass of the solid-state image sensor, or the like. FIG. 16 is an aberration diagram of Example 8 (spherical aberration, astigmatism, distortion aberration, and meridional comatic aberration).

Example 9

General specifications of an image pickup lens are as follows.

f = 4.76 mm
fB = 0.31 mm
F = 2.0
2Y = 7.128 mm
ENTP = 0 mm
EXTP = −4.39 mm
H1 = −0.06 mm
H2 = −4.45 mm

Surface data of the image pickup lens is as follows.

| S | R (mm) | D (mm) | Nd | vd | ER (mm) |
|---|---|---|---|---|---|
| 1(stop) | infinite | −0.14 | | | 1.19 |
| 2* | 3.434 | 0.70 | 1.54470 | 56.2 | 1.28 |
| 3* | 33.774 | 0.20 | | | 1.39 |
| 4* | 3.152 | 0.31 | 1.63200 | 23.4 | 1.47 |
| 5* | 2.432 | 0.80 | | | 1.59 |
| 6* | 7.376 | 0.25 | 1.63200 | 23.4 | 1.71 |
| 7* | 3.354 | 0.07 | | | 1.89 |
| 8* | 3.437 | 1.03 | 1.54470 | 56.2 | 2.21 |
| 9* | 2.316 | 0.14 | | | 2.38 |
| 10* | 2.732 | 1.44 | 1.54470 | 56.2 | 2.40 |
| 11* | −1.590 | 0.25 | | | 2.64 |
| 12* | 8.528 | 0.75 | 1.54470 | 56.2 | 2.93 |
| 13* | 1.276 | 0.90 | | | 3.49 |
| 14 | infinite | 0.15 | 1.51630 | 64.1 | 3.57 |
| 15 | infinite | | | | 3.60 |

Note that all the lenses are formed of plastic material.
Aspherical surface coefficients are as follows.

Second surface

K = −0.68553E+00, A4 = −0.19250E−04, A6 = −0.69252E−03,
A8 = −0.17721E−02, A10 = 0.86110E−03, A12 = −0.54362E−03
Third surface K = 0.22837E+02, A4 = −0.32487E−01, A6 = 0.22529E−01,
A8 = −0.17326E−01, A10 = 0.49086E−02, A12 = −0.78873E−03
Fourth surface K = −0.13783E+02, A4 = −0.28067E−01, A6 = 0.13219E−01,
A8 = −0.10058E−01, A10 = 0.22554E−02, A12 = −0.28747E−03
Fifth surface K = −0.78372E+01, A4 = −0.66342E−02, A6 = 0.13691E−03,
A8 = −0.20800E−02, A10 = 0.22073E−03, A12 = −0.67064E−04

Sixth surface

K = −0.30000E+02, A4 = −0.33837E−01, A6 = −0.12318E−02,
A8 = −0.21527E−02, A10 = 0.36435E−03, A12 = 0.11959E−03
Seventh surface K = −0.17909E+02, A4 = −0.13373E−01, A6 = −0.32219E−02,
A8 = 0.43027E−03, A10 = −0.30772E−03, A12 = 0.11630E−03
Eighth surface K = −0.27069E+02, A4 = −0.14283E−03, A6 = 0.11874E−02,
A8 = −0.30928E−03, A10 = −0.34580E−04, A12 = 0.87793E−05
Ninth surface K = −0.21971E+02, A4 = −0.91600E−02, A6 = −0.10878E−02,
A8 = −0.34005E−03, A10 = −0.18355E−04, A12 = 0.48887E−05
Tenth surface K = −0.28818E+02, A4 = −0.10609E−02, A6 = −0.73584E−03,
A8 = −0.28408E−03, A10 = −0.10636E−04, A12 = 0.40621E−06
Eleventh surface K = −0.37554E+01, A4 = −0.25054E−01, A6 = 0.87893E−02,
A8 = −0.22598E−02, A10 = 0.51536E−03, A12 = −0.45482E−04,
A14 = −0.11768E−05, A16 = 0.22525E−06
Twelfth surface K = 0.56764E+01, A4 = −0.57365E−01, A6 = 0.89216E−02,
A8 = −0.56137E−03, A10 = −0.63399E−05, A12 = 0.46011E−05,
A14 = −0.30453E−06
Thirteenth surface K = −0.36989E+01, A4 = −0.30749E−01, A6 = 0.62589E−02,
A8 = −0.76423E−03, A10 = 0.49084E−04, A12 = −0.12374E−05,
A14 = −0.17940E−08

Single lens data of the image pickup lens is as follows.

| Lens | First surface | Focal length (mm) |
|---|---|---|
| 1 | 2 | 6.962 |
| 2 | 4 | −20.260 |
| 3 | 6 | −9.976 |
| 4 | 8 | −19.287 |
| 5 | 10 | 2.091 |
| 6 | 12 | −2.859 |

Values corresponding to conditional expressions (1) to (6) are as follows.

(1) vd1 = 56.0
(2) vd2 = 23.4
(3) DL/f = 1.25
(4) f1/f = 1.46
(5) f45/f = 0.54
(6) L/2Y = 1.01

Figure 17:
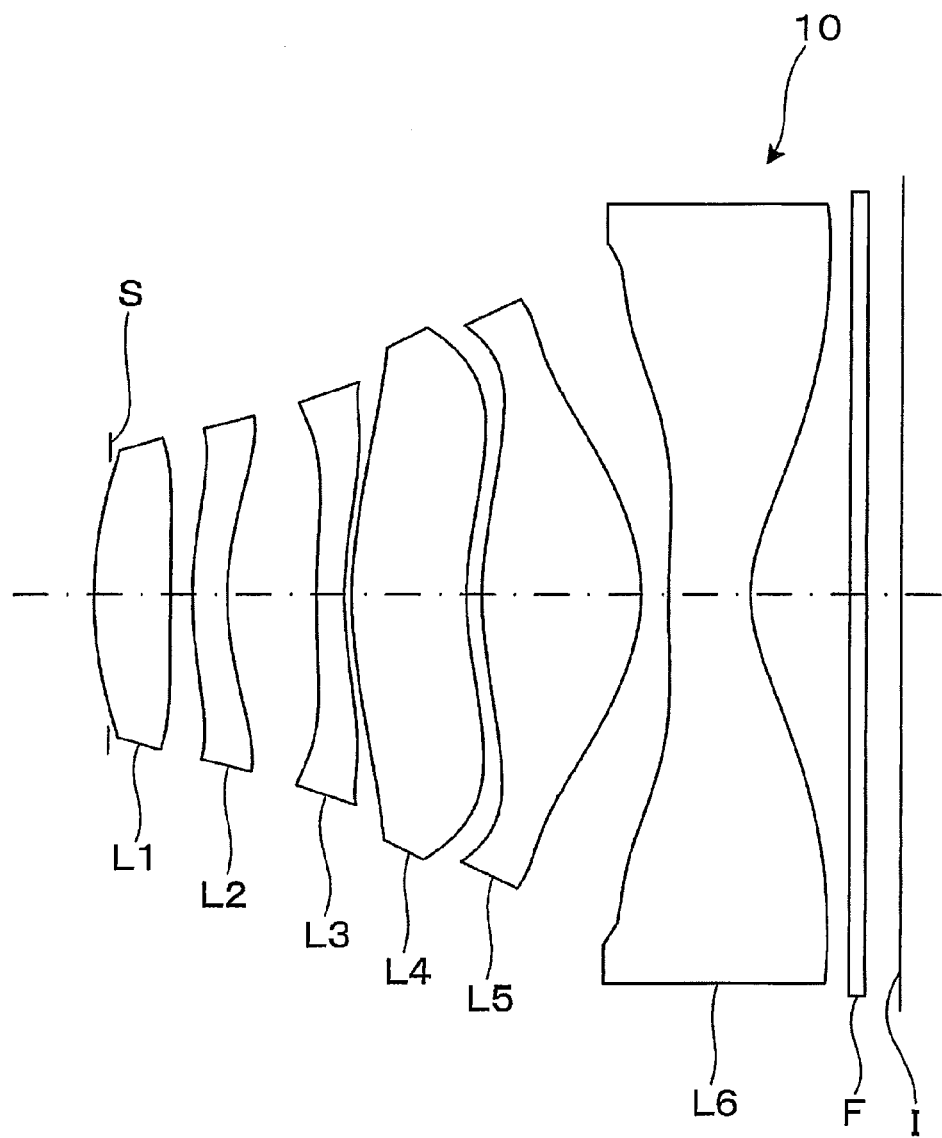
FIG. 17 is a cross-sectional view of a lens in Example 9.

FIG. 17 is a cross-sectional view of the lens of Example 9. Symbol L1 indicates the first lens having a positive refractive power and with a meniscus shape having a convex surface directed to the object side, symbol L2 indicates the second lens having a negative refractive power and with a meniscus shape having a concave surface directed to the image side, symbol L3 indicates the third lens having a negative refractive power and with a meniscus shape having a concave surface directed to the image side, symbol L4 indicates the fourth lens having a negative refractive power and with a meniscus shape having a concave surface directed to the image side, symbol L5 indicates the fifth lens with convex shapes on both sides and having a positive refractive power, symbol L6 indicates the sixth lens having a negative refractive power and with a meniscus shape having a concave surface directed to the image side, symbol S indicates an aperture stop, and symbol I indicates an image pickup surface. Furthermore, symbol F means a parallel plate which is assumed to be an optical low-pass filter, an IR cut filter, or a seal glass of the solid-state image sensor, or the like. FIG. 18 is an aberration diagram of Example 9 (spherical aberration, astigmatism, distortion aberration, and meridional comatic aberration).

The plastic material utilized for the above image pick up lens 10 has a large refractive index change at the time of temperature change, and thus, if all the lenses of the first lens L1 to the sixth lens L6 are configured with plastic lenses, there arises a problem in which the image point position of the entire image pickup lens system is changed when ambient temperature is changed.

As to this problem, recently it has become clear that the temperature change of the plastic material can be made smaller when inorganic particles are mixed in the plastic material. As explained in detail, generally, when particles are mixed in a transparent plastic material, light scattering is caused and transmittance is lowered, and thus it is difficult to use this material as an optical material, but it is possible to substantially prevent scattering from occurring by making the size of the particle smaller than the wavelength of a transmitted light rays. Although the refractive index of the plastic material decreases as the temperature rises, the refractive index of the inorganic particle increases as the temperature rises.

Accordingly, by utilizing these temperature dependences to cancel out each other, it is possible to hardly cause the refractive index change. Specifically, by dispersing inorganic particles having a maximum length of 20 nanometers or less into the plastic material of base material, there is obtained a plastic material having an extremely small temperature dependence of the refractive index. For example, by dispersing particles of niobium oxide ($Nb_2O_5$) into acryl, it is possible to reduce the refractive index change caused by the temperature change. In the present invention, by using the plastic material, in which such inorganic particles are dispersed, for a positive lens having a comparatively large refractive power (first lens L1) or all the lenses (first lens L1 to sixth lens L6), it becomes possible to keep the change of the image point position small on the substrate at the time of temperature change of the entire image pickup lens system.

Furthermore, recently, for a method of mounting image pickup devices at a low cost and also in large quantities, there is proposed a technique of performing reflow processing (heating processing) for a substrate preliminarily potted with solder while an optical element is mounted together with an IC chip and other electronic components, and of mounting the electronic components and the optical element on the substrate at the same time by melting the solder.

Although, in order to perform the mounting through the use of such reflow processing, it is necessary to heat the optical element at approximately 200° C. to 260° C. together with the electronic components, there is a problem in which thermal deformation or discoloration is caused and the optical performance thereof is degraded in the case of a lens using thermoplastic resin under such a high temperature.

Although, as one of methods for solving such a problem, there has been proposed a technique of using a glass mold lens which has an excellent heat resistant performance to thereby realize both the downsizing and the optical performance under a high temperature environment, there has been a problem in which the glass mold lens costs more than the lens using the thermoplastic resin, and thus cannot meet the demand for cost reduction of the image pickup device.

Accordingly, energy-curable resin is used as the material of the image pickup lens 10, and, since this lens has a smaller reduction in optical performance when exposed to high temperature than a lens using a polycarbonate-based or a poly-olefin-based thermoplastic resin, the lens is effective for the reflow processing and is more easily manufactured than the glass mold lens to thereby become more inexpensive, and thus it is possible to realize both of a lower cost and a mass production of the image pickup device incorporating the image pickup lens. Note that the energy-curable resin indicates both heat-curable resin and ultraviolet-curable resin.

The plastic lens configuring the image pickup lens 10 of the present invention may be formed using the above energy-curable resin.

Note that, in the above described Examples 1 to 9, the principal rays incident angle of a light rays entering the image pickup surface of the solid-state image sensor is not always designed to be sufficiently small on the periphery of the image pickup surface. In a recent technique, however, it has become possible to reduce shading (luminous variation) by rearrangements of a color filter and an on-chip micro-lens array of the solid-state image sensor. Specifically, when the pitch of the array of the color filter and the on-chip micro-lens array is set to be slightly smaller than a pixel pitch in the image pickup surface of the image sensor, the color filters and the on-chip micro-lens are shifted toward the optical axis side of the image pickup lens 10, for the respective pixels toward a periphery of the image pickup surface, and thus it is possible to guide obliquely-entered light rays efficiently to the light receiving part of each pixel. Therefore, it is possible to suppress the shading caused in the solid-state image sensor small. The present examples are design examples aiming at further downsizing utilizing the alleviation of the above-described requirement.

The invention claimed is:
1. An image pickup lens for forming an image of a subject on a photoelectrical conversion part of a solid-state image sensor, comprising,
in order from an object side thereof:
a first lens having a positive refractive power and comprising a convex surface directed to an object side;
a second lens having a negative refractive power and comprising a concave surface directed to an image side;
a third lens having a positive or negative refractive power;
a fourth lens having a positive or negative refractive power;
a fifth lens having a positive refractive power and comprising a convex surface directed to the image side; and
a sixth lens having a negative refractive power and comprising a concave surface directed to the image side,
wherein an image side surface of the sixth lens comprises an aspherical shape and an inflection point at a position other than an intersection point with an optical axis, and
the image pickup lens satisfies the following conditional expressions,

$vd1 > 50$ $vd2 \leq 30$ where,
vd1 is an Abbe number of the first lens, and
vd2 is an Abbe number of the second lens.
2. The image pickup lens according to claim 1,
wherein the image pickup lens satisfies the following conditional expression:

$0.8 < DL/f < 1.4$ where,
DL is a distance on the optical axis from a surface apex of the first lens on the object side to a surface apex of the sixth lens on the image side, and f is a focal length of an entire image pickup lens system.

3. The image pickup lens according to claim 1, wherein the image pickup lens satisfies the following conditional expression:

$$0.8 < f1/f < 1.6$$

where, f1 is a focal length of the first lens, and f is a focal length of an entire image pickup lens system.

4. The image pickup lens according to claim 1, Wherein the image pickup lens satisfies the following conditional expression:

$$0.35 < f45/f < 0.60$$

where, f45 is a composite focal length of the fourth lens and the fifth lens, and f is a focal length of an entire image pickup lens system.

5. The image pickup lens according to claim 1, wherein all the lenses are formed of plastic material.

6. The image pickup lens according to claim 1, further comprising a lens having substantially no power.

\* \* \* \* \*